US012455382B2

(12) United States Patent
Ono et al.

(10) Patent No.: US 12,455,382 B2
(45) Date of Patent: Oct. 28, 2025

(54) DISTANCE MEASURING SENSOR, SIGNAL PROCESSING METHOD, AND DISTANCE MEASURING MODULE

(71) Applicant: SONY SEMICONDUCTOR SOLUTIONS CORPORATION, Kanagawa (JP)

(72) Inventors: Hiroaki Ono, Kanagawa (JP); Hironaga Sano, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1051 days.

(21) Appl. No.: 17/594,030

(22) PCT Filed: Mar. 26, 2020

(86) PCT No.: PCT/JP2020/013572
§ 371 (c)(1),
(2) Date: Sep. 30, 2021

(87) PCT Pub. No.: WO2020/209079
PCT Pub. Date: Oct. 15, 2020

(65) Prior Publication Data
US 2022/0155459 A1 May 19, 2022

(30) Foreign Application Priority Data
Apr. 9, 2019 (JP) ................................. 2019-073959

(51) Int. Cl.
G01S 17/93 (2020.01)
G01C 3/06 (2006.01)
(Continued)

(52) U.S. Cl.
CPC .............. *G01S 17/931* (2020.01); *G01C 3/06* (2013.01); *G01S 7/486* (2013.01); *G01S 17/08* (2013.01)

(58) Field of Classification Search
None
See application file for complete search history.

(56) References Cited

U.S. PATENT DOCUMENTS

2009/0146048 A1   6/2009   Chiba
2009/0195435 A1   8/2009   Kapilevich
(Continued)

FOREIGN PATENT DOCUMENTS

CN   101393051 A   3/2009
CN   103226014 A   7/2013
(Continued)

OTHER PUBLICATIONS

International Search Report and Written Opinion of PCT Application No. PCT/JP2020/013572, issued on Jun. 16, 2020, 11 pages of ISRWO.

Primary Examiner — Hovhannes Baghdasaryan
(74) Attorney, Agent, or Firm — CHIP LAW GROUP

(57) ABSTRACT

The present technology relates to a distance measuring sensor, a signal processing method, and a distance measuring module that enable calculation of distance information and outdoor judgment to be performed by the distance measuring sensor alone. The distance measuring sensor includes a distance measuring unit that calculates distance information to an object from a signal obtained by a light receiving unit that receives reflected light obtained by reflection of irradiation light emitted from a predetermined light emitting source by the object, an ambient light calculation unit that calculates an ambient light component included in the signal obtained by the light receiving unit, and an outdoor information calculation unit that calculates outdoor
(Continued)

information on the basis of the ambient light component. The present technology can be applied to, for example, for example, a distance measuring module or the like that measures the distance to a subject.

12 Claims, 19 Drawing Sheets

(51) Int. Cl.
    *G01S 7/486*     (2020.01)
    *G01S 17/08*     (2006.01)
    *G01S 17/931*     (2020.01)

(56) References Cited

U.S. PATENT DOCUMENTS

| | | |
|---|---|---|
| 2013/0194390 A1 | 8/2013 | Hirooka |
| 2014/0126835 A1 | 5/2014 | Shioya |
| 2015/0355330 A1 | 12/2015 | Oberhammer et al. |
| 2016/0150147 A1 | 5/2016 | Shioya |
| 2018/0011194 A1 | 1/2018 | Masuda et al. |
| 2018/0035037 A1 | 2/2018 | Shioya |

FOREIGN PATENT DOCUMENTS

| | | |
|---|---|---|
| CN | 103813105 A | 5/2014 |
| CN | 104838284 A | 8/2015 |
| CN | 107407728 A | 11/2017 |
| CN | 107819999 A | 3/2018 |
| CN | 108445500 A | 8/2018 |
| CN | 109194856 A | 1/2019 |
| EP | 2917762 A1 | 9/2015 |
| JP | 2005-175888 A | 6/2005 |
| JP | 2009-074855 A | 4/2009 |
| JP | 2011247872 A | 12/2011 |
| JP | 2012-145545 A | 8/2012 |
| JP | 2013-156109 A | 8/2013 |
| JP | 2014-081254 A | 5/2014 |
| JP | 2014-096000 A | 5/2014 |
| JP | 2016-502657 A | 1/2016 |
| KR | 10-2009-0030197 A | 3/2009 |
| WO | 2014/072100 A1 | 5/2014 |
| WO | 2016/151918 A1 | 9/2016 |
| WO | 2017/159312 A1 | 9/2017 |

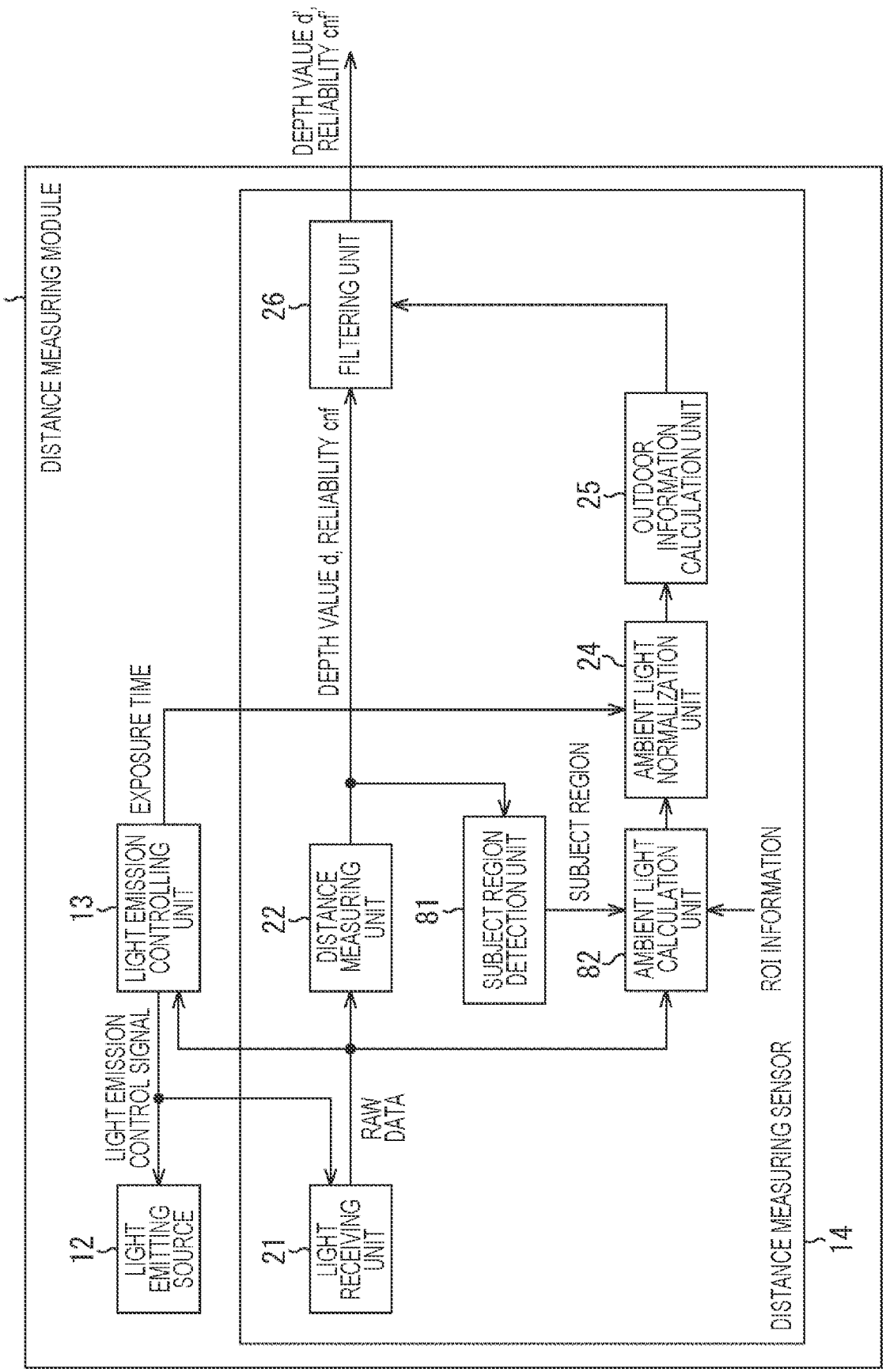

DISTANCE MEASURING SENSOR, SIGNAL PROCESSING METHOD, AND DISTANCE MEASURING MODULE

CROSS REFERENCE TO RELATED APPLICATIONS

This application is a U.S. National Phase of International Patent Application No. PCT/JP2020/013572 filed on Mar. 26, 2020, which claims priority benefit of Japanese Patent Application No. JP 2019-073959 filed in the Japan Patent Office on Apr. 9, 2019. Each of the above-referenced applications is hereby incorporated herein by reference in its entirety.

TECHNICAL FIELD

The present technology relates to a distance measuring sensor, a signal processing method, and a distance measuring module, and more particularly, to a distance measuring sensor, a signal processing method, and a distance measuring module that enable calculation of distance information and outdoor judgment to be performed by the distance measuring sensor alone.

BACKGROUND ART

In recent years, with the progress of semiconductor technology, miniaturization of a distance measuring module that measures the distance to an object has advanced. Therefore, for example, installation of the distance measuring module on a mobile terminal such as a so-called smartphone, which is a small information processing device having a communication function, is realized.

Examples of a distance measuring method in the distance measuring module include an indirect time of flight (ToF) method and a structured light method. In the Indirect ToF method, light is emitted toward an object and the light reflected on a surface of the object is detected, and the distance to the object is calculated on the basis of a measurement value obtained by measuring a flight time of the light. In the structured light method, pattern light is emitted toward an object, and the distance to the object is calculated on the basis of an image obtained by imaging distortion of a pattern on a surface of the object.

A distance measuring method in which an object is irradiated with active light and reflected light reflected by the object is received, such as the Indirect ToF method and the structured light method is susceptible to ambient light such as sunlight. Therefore, it is useful to be able to judge whether a measurement place is outdoors or indoors.

For example, there is an imaging device in which an outdoor detection sensor is provided separately from an imaging element to detect that it is outdoors (For example, Patent Document 1).

CITATION LIST

Patent Document

Patent Document 1: Japanese Patent Application Laid-Open No. 2005-175888

SUMMARY OF THE INVENTION

Problems to be Solved by the Invention

However, it is desirable to perform outdoor judgment while acquiring distance information by a distance measuring sensor alone, instead of separately providing an outdoor detection sensor.

The present technology has been made in view of such a situation, and enables calculation of distance information and outdoor judgment to be performed by a distance measuring sensor alone.

Solution to Problems

A distance measuring sensor according to a first aspect of the present technology includes a distance measuring unit that calculates distance information to an object from a signal obtained by a light receiving unit that receives reflected light obtained by reflection of irradiation light emitted from a predetermined light emitting source by the object, an ambient light calculation unit that calculates an ambient light component included in the signal obtained by the light receiving unit, and an outdoor information calculation unit that calculates outdoor information on the basis of the ambient light component.

A signal processing method according to a second aspect of the present technology includes by using a distance measuring sensor, calculating distance information to an object from a signal obtained by a light receiving unit that receives reflected light obtained by reflection of irradiation light emitted from a predetermined light emitting source by the object, by using the distance measuring sensor, calculating an ambient light component included in the signal obtained by the light receiving unit, and by using the distance measuring sensor, calculating outdoor information on the basis of the ambient light component.

A distance measuring module according to a third aspect of the present technology includes a predetermined light emitting source and a distance measuring sensor, the distance measuring sensor including a distance measuring unit that calculates distance information to an object from a signal obtained by a light receiving unit that receives reflected light obtained by reflection of irradiation light emitted from the predetermined light emitting source by the object, an ambient light calculation unit that calculates an ambient light component included in the signal obtained by the light receiving unit, and an outdoor information calculation unit that calculates outdoor information on the basis of the ambient light component.

In the first to third aspect of the present technology, distance information to an object is calculated from a signal obtained by a light receiving unit that receives reflected light obtained by reflection of irradiation light emitted from a predetermined light emitting source by the object, an ambient light component included in the signal obtained by the light receiving unit is calculated, and outdoor information is calculated on the basis of the ambient light component.

The distance measuring sensor and the distance measuring module may be an independent device or a module incorporated in another device.

BRIEF DESCRIPTION OF DRAWINGS

FIG. 13 is a block diagram of a second embodiment of the distance measuring module.

MODE FOR CARRYING OUT THE INVENTION

Hereinafter, embodiments for implementing the present technology (hereinafter, referred to as embodiments) will be described. Note that the description will be given in the following order.

1. Schematic Configuration Example of Distance Measuring Module
2. Operation of Distance Measuring Sensor by Indirect ToF Method
3. Detailed Configuration Example of Distance Measuring Sensor
4. Depth Value Calculation Process
5. Second Embodiment
6. Third Embodiment
7. Configuration Example of Electronic Apparatus
8. Configuration Example of Computer
9. Example of Application to Moving Object 1. Schematic Configuration Example of Distance Measuring Module FIG. 1 is a block diagram illustrating a schematic configuration example in a first embodiment of a distance measuring module to which the present technology is applied.

Figure 1:
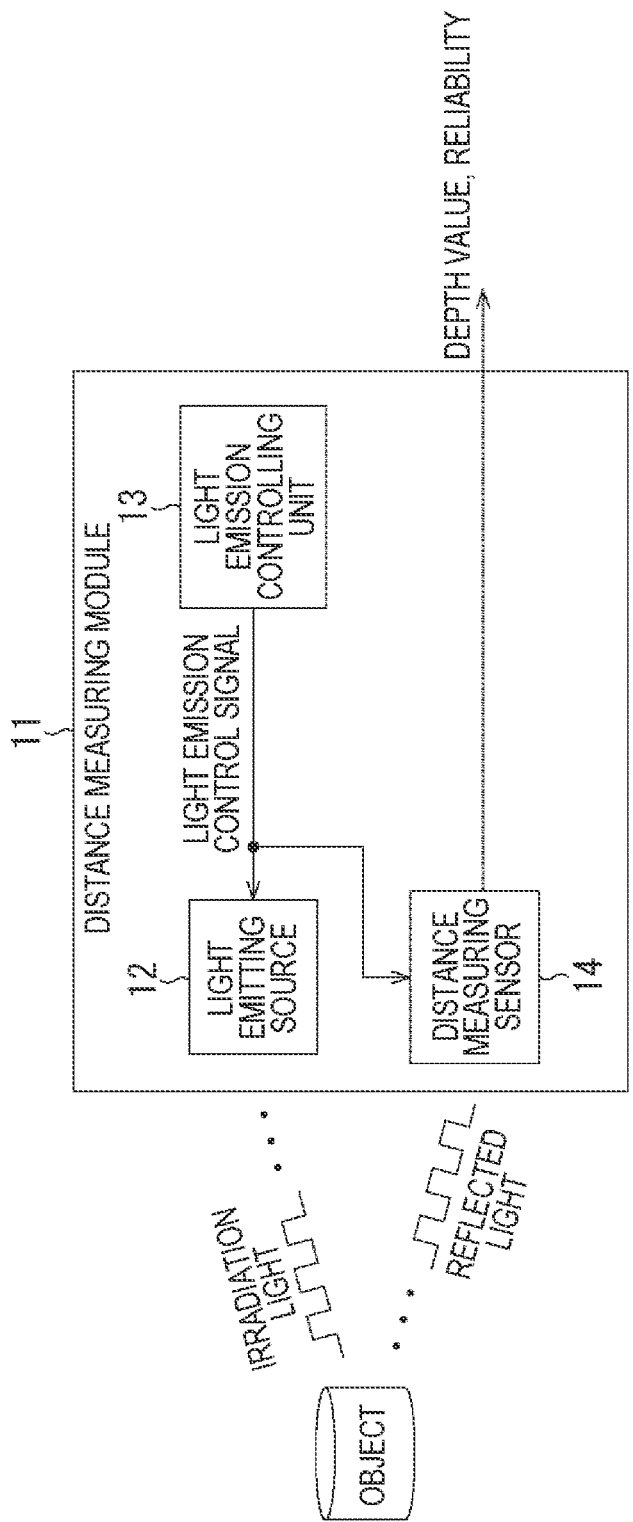
FIG. 1 is a block diagram illustrating a schematic configuration example in a first embodiment of a distance measuring module to which the present technology is applied.

A distance measuring module 11 illustrated in FIG. 1 is a distance measuring module that performs distance measurement by the Indirect ToF method, and includes a light emitting source 12, a light emission controlling unit 13, and a distance measuring sensor 14.

The distance measuring module 11 irradiates a predetermined object as a subject with light, receives light (reflected light) obtained by reflection of the light (irradiation light) by the object, and thus measures a depth value and reliability as distance information to the object, and outputs the depth value and the reliability.

The light emitting source 12 includes, for example, an infrared laser diode or the like as a light source, emits light while performing modulation at a timing corresponding to a light emission control signal supplied from the light emission controlling unit 13, and irradiates an object with irradiation light.

The light emission controlling unit 13 controls the light emitting source 12 by supplying a light emission control signal of a predetermined frequency (for example, 20 MHz or the like) to the light emitting source 12. Furthermore, the light emission controlling unit 13 supplies a light emission control signal also to the distance measuring sensor 14 in order to drive a light receiving unit 21 in accordance with the light emission timing of the light emitting source 12.

Although the distance measuring sensor 14 will be described later in detail with reference to FIG. 2, a pixel array unit 32 in which a plurality of pixels 31 is two-dimensionally arranged receives reflected light from an object. Then, the distance measuring sensor 14 generates and outputs the depth value and the reliability for each of the pixels 31 of the pixel array unit 32.

2. Operation of Distance Measuring Sensor by Indirect ToF Method

Next, operation of the distance measuring sensor 14 will be described with reference to FIGS. 2 to 6.

Figure 2:
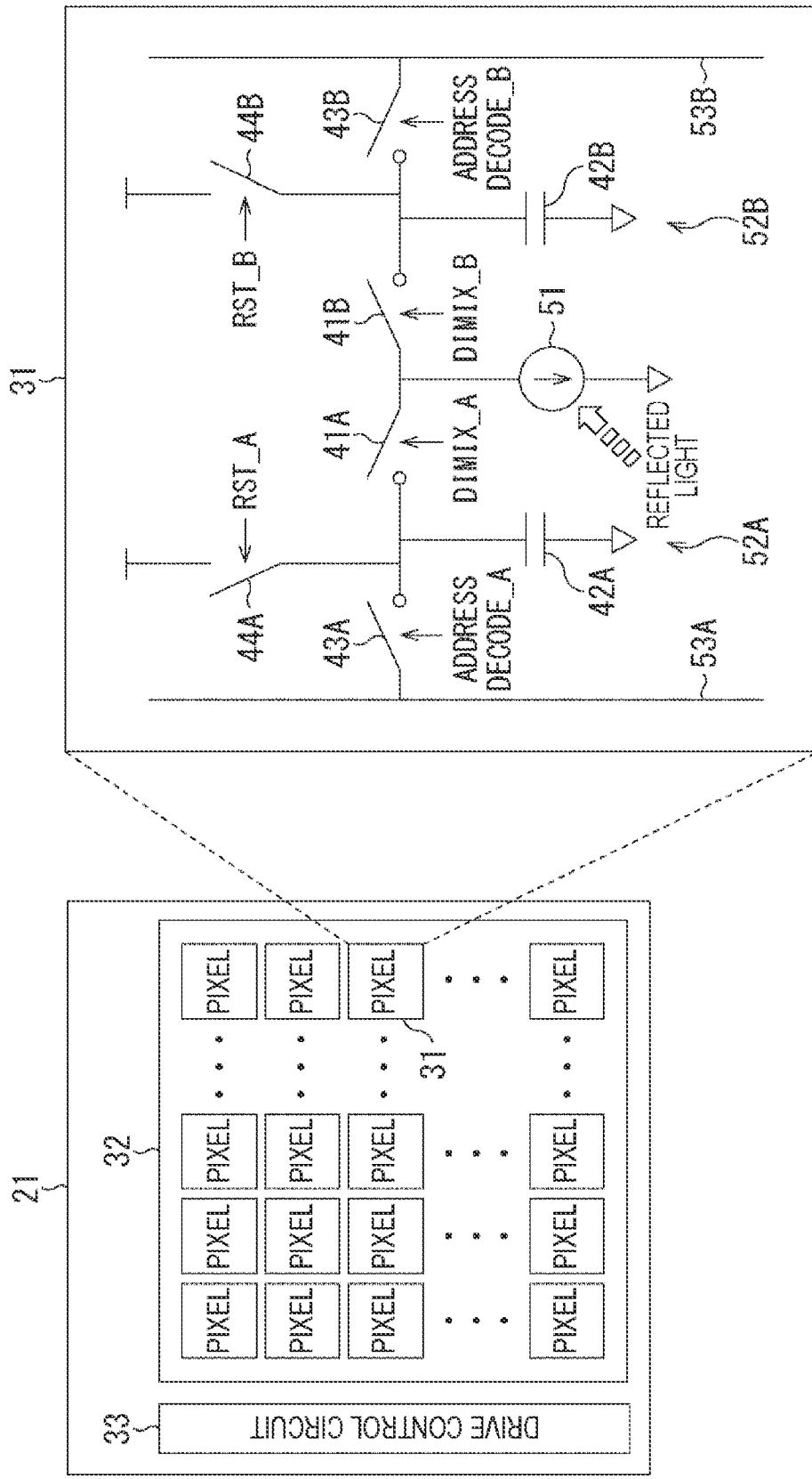
FIG. 2 is a diagram explaining operation of a distance measuring sensor.

The distance measuring sensor 14 includes the light receiving unit 21 illustrated in FIG. 2.

The light receiving unit 21 includes the pixel array unit 32 in which pixels 31 which each generate electric charge according to the amount of received light and output a signal according to the electric charge are two-dimensionally arranged in a matrix in the row direction and the column direction, and a drive control circuit 33 arranged in a peripheral region of the pixel array unit 32.

The drive control circuit 33 outputs a control signal (for example, a distribution signal DIMIX, a selection signal ADDRESS DECODE, a reset signal RST, and the like to be described later) for controlling driving of the pixel 31 on the basis of, for example, a light emission control signal supplied from the light emission controlling unit 13.

The pixel 31 includes a photodiode 51, and a first tap 52A and a second tap 52B that detect electric charge photoelectrically converted by the photodiode 51. In the pixel 31, electric charge generated in the one photodiode 51 is distributed to the first tap 52A or the second tap 52B. Then, the electric charge in generated in the photodiode 51 and distributed to the first tap 52A is output as a detection signal A from a signal line 53A, and the electric charge generated in the photodiode 51 and distributed to the second tap 52B is output as a detection signal B from the signal line 53B.

The first tap 52A includes a transfer transistor 41A, a floating diffusion (FD) unit 42A, a selection transistor 43A, and a reset transistor 44A. Similarly, the second tap 52B includes a transfer transistor 41B, an FD unit 42B, a selection transistor 43B, and a reset transistor 44B.

Operation of the pixel 31 will be described.

Figure 3:
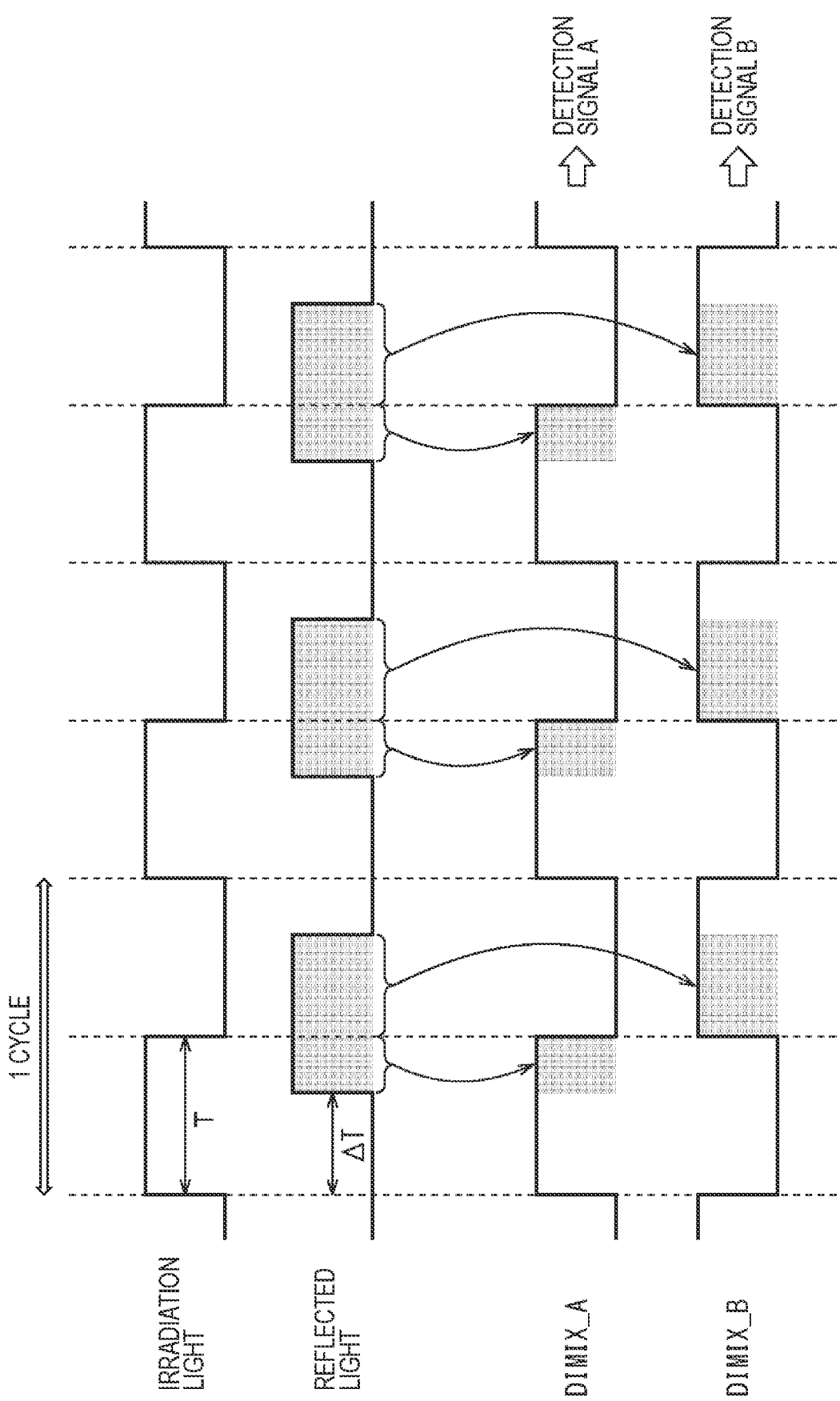
FIG. 3 is a diagram explaining operation of a pixel according to a 4-phase method.

As illustrated in FIG. 3, the light emitting source 12 outputs irradiation light modulated (one cycle=2T) so as to repeat on/off of irradiation at an irradiation time T, and the photodiode 51 receives the reflected light with a delay of a delay time ΔT corresponding to the distance to the object. Furthermore, the distribution signal DIMIX_A controls on/off of the transfer transistor 41A, and the distribution signal DIMIX_B controls on/off of the transfer transistor 41B. The distribution signal DIMIX_A is a signal having the same phase as that of the irradiation light, and the distribution signal DIMIX_B has a phase obtained by inverting the phase of the distribution signal DIMIX_A.

Therefore, in FIG. 2, electric charge generated by reception of the reflected light by the photodiode 51 is transferred to the FD unit 42A while the transfer transistor 41A is turned on according to the distribution signal DIMIX_A, and is transferred to the FD unit 42B while the transfer transistor 41B is turned on according to the distribution signal DIMIX_B. Therefore, in a predetermined period during which irradiation with the irradiation light for the irradiation time T is periodically performed, the electric charge transferred via the transfer transistor 41A is sequentially accumulated in the FD unit 42A, and the electric charge transferred via the transfer transistor 41B is sequentially accumulated in the FD unit 42B.

Then, if the selection transistor 43A is turned on according to the selection signal ADDRESS DECODE_A after the end of the period for accumulating electric charge, the electric charge accumulated in the FD unit 42A is read via the signal line 53A, and the detection signal A corresponding to the amount of the electric charge is output from the light receiving unit 21. Similarly, if the selection transistor 43B is turned on according to the selection signal ADDRESS DECODE_B, the electric charge accumulated in the FD unit 42B is read via the signal line 53B, and the detection signal B corresponding to the charge amount is output from the light receiving unit 21. Furthermore, the electric charge accumulated in the FD unit 42A is discharged if the reset transistor 44A is turned on according to a reset signal RST_A, and the electric charge accumulated in the FD unit 42B is discharged if the reset transistor 44B is turned on according to a reset signal RST_B.

As described above, the pixel 31 distributes the electric charge generated by the reflected light received by the photodiode 51 to the first tap 52A or the second tap 52B according to the delay time ΔT, and outputs the detection signal A and the detection signal B. Then, the delay time ΔT corresponds to the time in which the light emitted from the light emitting source 12 flies to the object, is reflected by the object, and then flies to the light receiving unit 21, that is, corresponds to the distance to the object. Therefore, the distance measuring module 11 can obtain the distance (depth value) to the object according to the delay time ΔT on the basis of the detection signal A and the detection signal B.

However, in the pixel array unit 32, there is a case where the detection signal A and the detection signal B are affected differently for each pixel 31 due to a deviation (sensitivity difference) in characteristics of each element such as the photodiode 51 and the pixel transistor such as the transfer transistor 41 included in each pixel 31. Therefore, in the distance measuring module 11 of the Indirect ToF method, a technique of removing the sensitivity difference between the taps of each pixel and improving the SN ratio by acquiring the detection signal A and the detection signal B obtained by receiving reflected light by changing the phase in the same pixel 31 is adopted.

As a method of receiving reflected light by changing the phase and calculating the depth value, for example, a detection method by using two phases (2-phase method) and a detection method by using four phases (4-phase method) will be described.

Figure 4:
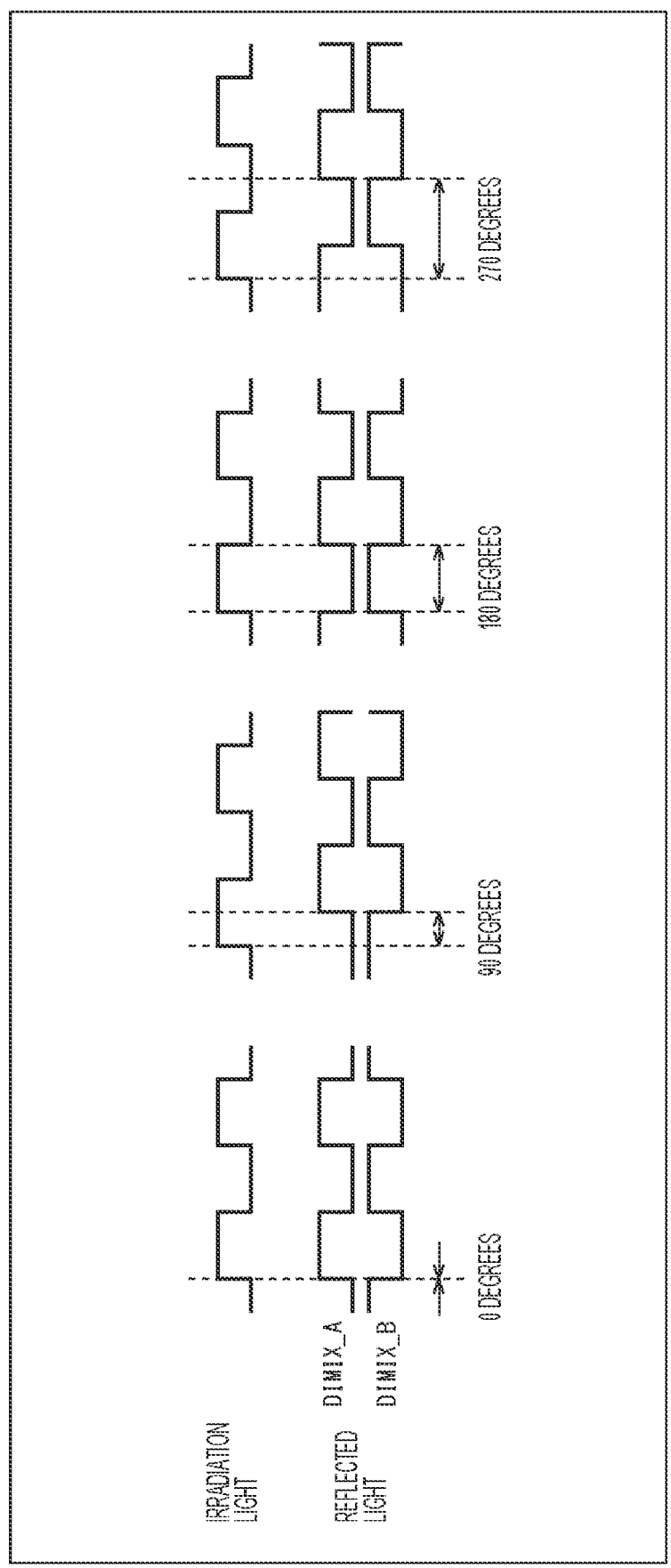
FIG. 4 is a diagram explaining a 4-phase method.

As illustrated in FIG. 4, the light receiving unit 21 receives reflected light at light receiving timings with phases shifted by 0°, 90°, 180°, and 270° with respect to the irradiation timing of irradiation light. More specifically, the light receiving unit 21 receives reflected light by changing the phase in a time division manner such that in a certain frame period, light is received with the phase set to 0° with respect to the irradiation timing of the irradiation light, in the next frame period, light is received with the phase set to 90°, in the next frame period, light is received with the phase set to 180°, and in the next frame period, light is received with the phase set to 270°.

Figure 5:
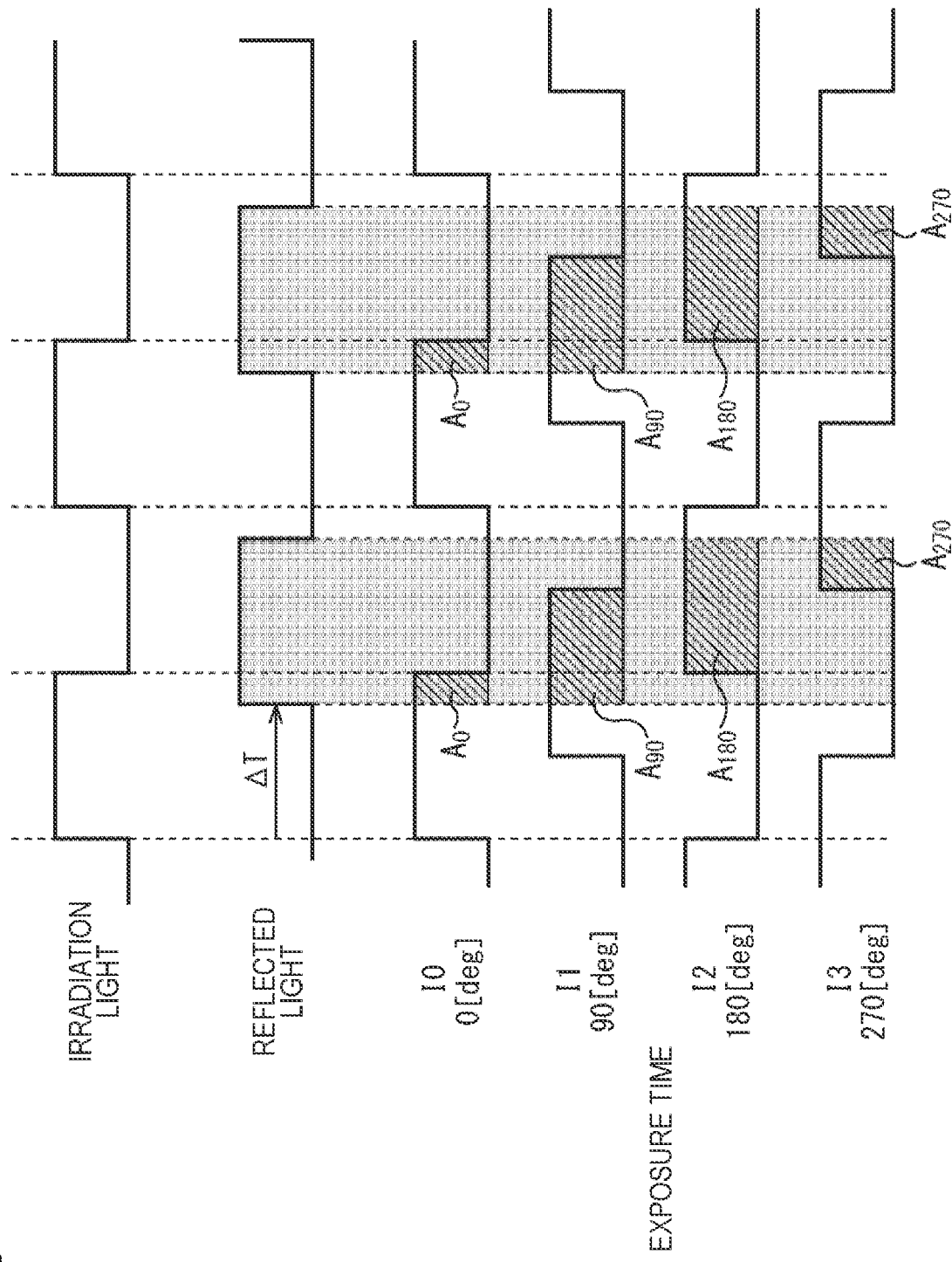
FIG. 5 is a diagram explaining a 4-phase method.

FIG. 5 is a diagram in which the exposure periods of the first tap 52A of the pixel 31 in the respective phases of 0°, 90°, 180°, and 270° are arranged so that the phase difference can be easily understood.

As illustrated in FIG. 5, in the first tap 52A, a detection signal A obtained by receiving light in the same phase (phase) 0° as the irradiation light is referred to as a detection signal $A_0$, a detection signal A obtained by receiving light in the phase (phase 90°) shifted by 90° from the irradiation light is referred to as a detection signal $A_{90}$, a detection signal A obtained by receiving light in a phase (phase 180°) shifted by 180° from the irradiation light is referred to as a detection signal $A_{180}$, and a detection signal A obtained by receiving light in a phase (phase 270°) shifted by 270° from the irradiation light is referred to as a detection signal $A_{270}$.

Furthermore, even though illustration is omitted, in the second tap 52B, a detection signal B obtained by receiving light in the same phase (phase 0°) as the irradiation light is referred to as a detection signal $B_0$, a detection signal B obtained by receiving light in the phase (phase 90°) shifted by 90° from the irradiation light is referred to as a detection signal $B_{90}$, a detection signal B obtained by receiving light in a phase (phase 180°) shifted by 180° from the irradiation light is referred to as a detection signal $B_{180}$, and a detection signal B obtained by receiving light in a phase (phase 270°) shifted by 270° from the irradiation light is referred to as a detection signal $B_{270}$.

Figure 6:
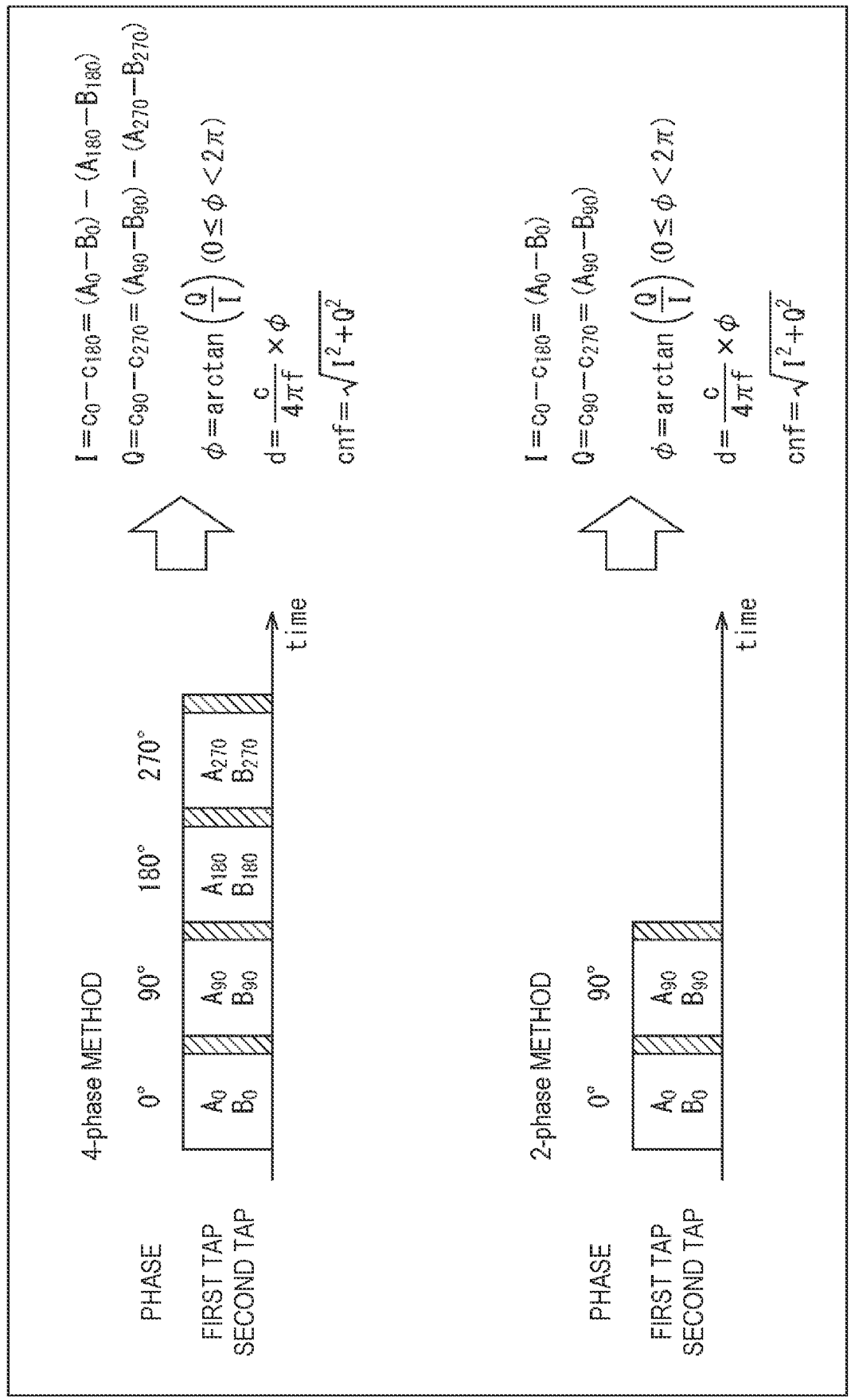
FIG. 6 is a diagram illustrating methods of calculating a depth value by using a 2-phase method and a 4-phase method.

FIG. 6 is a diagram illustrating methods of calculating a depth value and a reliability by using the 2-phase method and the 4-phase method.

In the Indirect ToF method, the depth value d can be obtained by the following Formula (1).

[Mathematical Expression 1]

$$d = \frac{c \cdot \Delta T}{2} = \frac{c \cdot \phi}{4\pi f} \tag{1}$$

In Formula (1), c represents a speed of light, ΔT represents a delay time, and f represents a modulation frequency of light. Furthermore, φ in Formula (1) represents the phase shift amount [rad] of reflected light and is expressed by the following Formula (2).

[Mathematical Expression 2]

$$\phi = \arctan\left(\frac{Q}{I}\right)(0 \leq \phi < 2\pi) \tag{2}$$

In the 4-phase method, I and Q in Formula (2) are calculated by the following Formulas (3) using the detection signals $A_0$ to $A_{270}$ and the detection signals $B_0$ to $B_{270}$ obtained by setting the phases to 0°, 90°, 180°, and 270°. I and Q are signals which each are obtained by assuming that the luminance change of irradiation light is a cos wave and converting the phase of the cos wave from the polar coordinate to the orthogonal coordinate system (IQ plane).

$$I = c_0 - c_{180} = (A_0 - B_0) - (A_{180} - B_{180})$$

$$Q = c_{90} - c_{270} = (A_{90} - B_{90}) - (A_{270} - B_{270}) \quad (3)$$

In the 4-phase method, for example, by taking a difference between detection signals in opposite phases in the same pixel, such as "$A_0 - A_{180}$" and "$A_{90} - A_{270}$" in Formula (3), it is possible to remove characteristic variation between taps existing in each pixel, that is, fixed pattern noise.

In contrast, in the 2-phase method, the depth value d to the object can be obtained by using only two phases in an orthogonal relationship among the detection signals $A_0$ to $A_{270}$ and the detection signals $B_0$ to $B_{270}$ obtained by setting the phases to 0°, 90°, 180°, and 270°. For example, in a case where the detection signals $A_0$ and $B_0$ in the phase of 0° and the detection signals $A_{90}$ and $B_{90}$ in the phase of 90° are used, I and Q in Formula (2) are expressed by the following Formulas (4).

$$I = c_0 - c_{180} = (A_0 - B_0)$$

$$Q = c_{90} - c_{270} = (A_{90} - B_{90}) \quad (4)$$

For example, in a case where the detection signals $A_{180}$ and $B_{180}$ in the phase of 180° and the detection signals $A_{270}$ and $B_{270}$ in the phase of 270° are used, I and Q in Formula (2) are expressed by the following Formulas (5).

$$I = c_0 - c_{180} = -(A_{180} - B_{180})$$

$$Q = c_{90} - c_{270} = -(A_{270} - B_{270}) \quad (5)$$

In the 2-phase method, the characteristic variation between the taps existing in each pixel cannot be removed; however, the depth value d to the object can be obtained only by the detection signals in the two phases. Therefore, distance measurement can be performed at a frame rate twice of that of the 4-phase method. The characteristic variation between the taps can be adjusted by a correction parameter such as a gain or an offset.

In the 2-phase method and the 4-phase method, the reliability cnf can be obtained by the following Formula (6).

[Mathematical Expression 3]

$$cnf = \sqrt{I^2 Q^2} \quad (6)$$

In the present embodiment, it does not matter whether the distance measuring module 11 uses the I signal and the Q signal corresponding to the delay time ΔT calculated by the 4-phase method or the I signal and the Q signal corresponding to the delay time ΔT calculated by the 2-phase method to use the depth value d and the reliability cnf. Either the 4-phase method or the 2-phase method may be fixedly used, or for example, a method of appropriately selecting the 4-phase method or the 2-phase or blending the 4-phase method and the 2-phase according to the motion of the object or the like may be used. Hereinafter, for the sake of simplicity, it is assumed that the 4-phase method is employed.

3. Detailed Configuration Example of Distance Measuring Sensor

Figure 7:
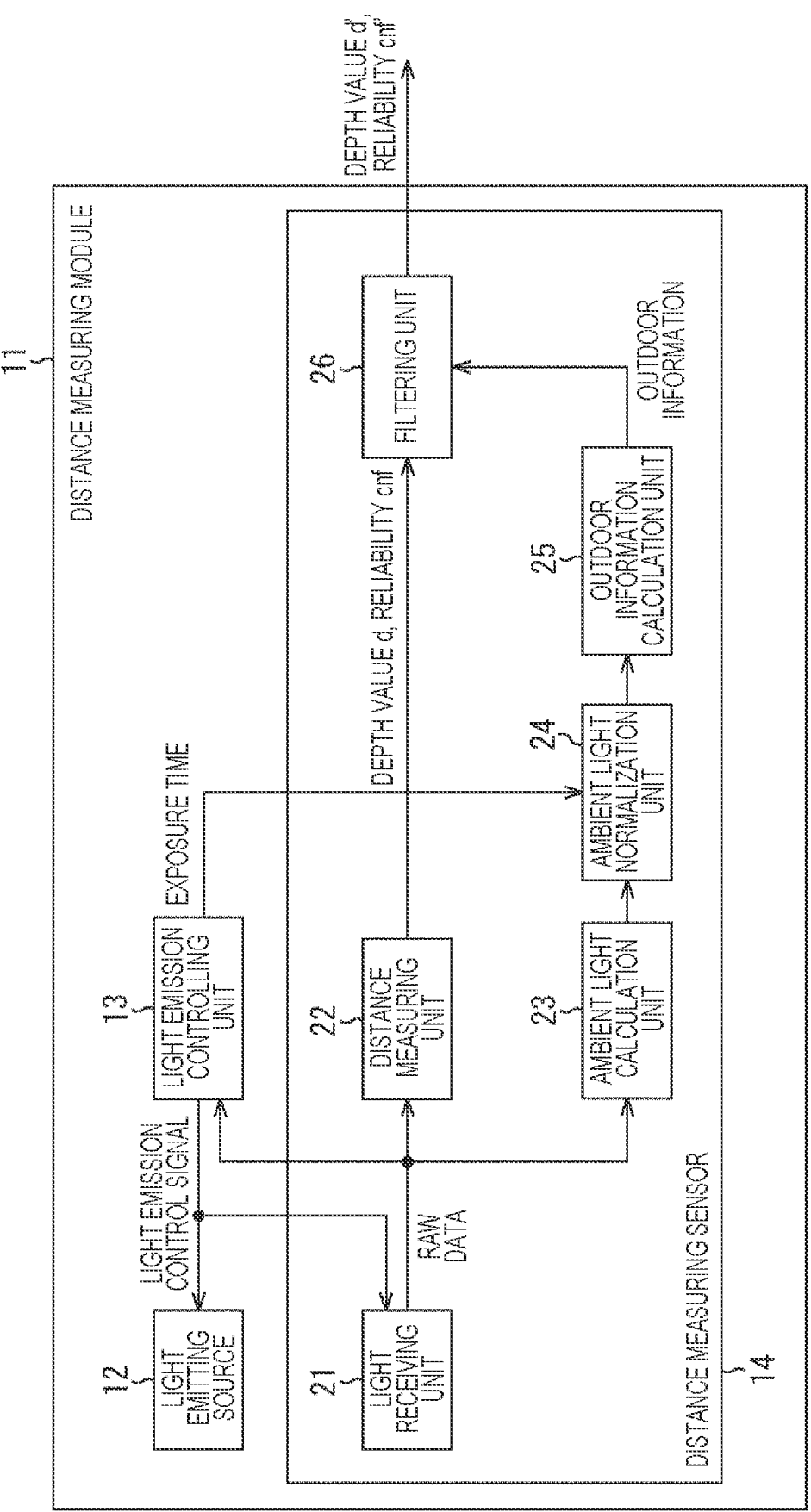
FIG. 7 is a block diagram of a distance measuring module including a detailed configuration of a distance measuring sensor.

FIG. 7 is a block diagram of the distance measuring module 11 including a detailed configuration of the distance measuring sensor 14.

In addition to the light receiving unit 21 illustrated in FIG. 2, the distance measuring sensor 14 includes a distance measuring unit 22, an ambient light calculation unit 23, an ambient light normalization unit 24, an outdoor information calculation unit 25, and a filtering unit 26.

The distance measuring module 11 irradiates a predetermined object with light, receives light (reflected light) obtained by reflection of the light (irradiation light) by the object, and thus measures and outputs a depth value and reliability as distance information to the object.

Specifically, the light receiving unit 21 sets each pixel 31 of the pixel array unit 32 as a measurement target pixel, and supplies RAW data, which is a detection signal corresponding to the light reception amount of reflected light received by the measurement target pixel, to the light emission controlling unit 13, the distance measuring unit 22, and the ambient light calculation unit 23.

The light emission controlling unit 13 controls the light emitting source 12 by supplying a light emission control signal of a predetermined frequency to the light emitting source 12, controls the exposure time on the basis of the RAW data of the light receiving unit 21, and generates a light emission control signal for achieving the set exposure time. Therefore, the light emission controlling unit 13 has an AE function (automatic exposure function) based on RAW data of the light receiving unit 21, and supplies the set exposure time to the ambient light normalization unit 24.

On the basis of the RAW data of the measurement target pixel supplied from the light receiving unit 21, the distance measuring unit 22 calculates a depth value d, which is distance information from the distance measuring module 11 to the object in the measurement target pixel, and a reliability cnf of the depth value d, and supplies the depth value d and the reliability cnf to the filtering unit 26. The method of calculating the depth value d and the reliability cnf thereof is as described above.

The ambient light calculation unit 23 calculates an ambient light component included in the RAW data of the measurement target pixel supplied from the light receiving unit 21, and supplies the ambient light component to the ambient light normalization unit 24.

Figure 8:
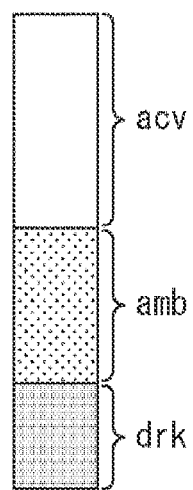
FIG. 8 is a diagram illustrating a configuration of RAW data obtained by one pixel.

FIG. 8 illustrates a configuration of RAW data (detection signal) obtained by one pixel.

The RAW data includes an active component acv, an ambient light component amb, and a dark current component drk. The active component acv is a light component which is irradiation light that was emitted from the light emitting source 12, was reflected by the object, and has returned. The ambient light component amb is a light component of ambient light such as sunlight. The dark current component drk is a noise component generated by the dark current generated in the light receiving unit 21 regardless of light reception.

Figure 9:
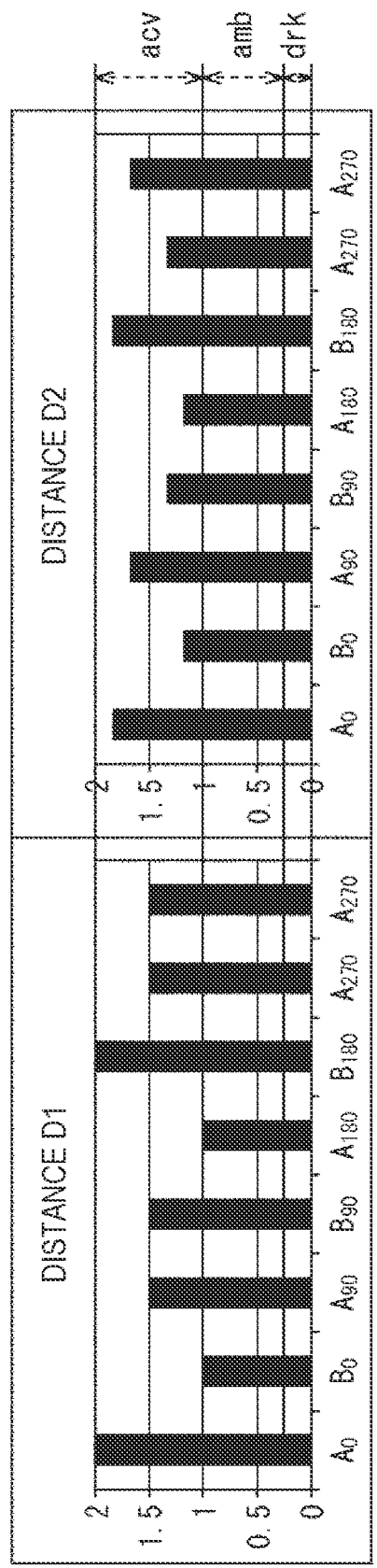
FIG. 9 is a diagram illustrating an example of RAW data according to the 4-phase method.

FIG. 9 illustrates proportions of the active component acv, the ambient light component amb, and the dark current component drk in the detection signals $A_i$ and $B_i$ (i=any of 0, 90, 180, 270) in a case where the distance measuring sensor 14 measures different distances D1 and D2.

Here, the ambient light component amb can be obtained by the following Formula (7).

[Mathematical Expression 4]

$$amb = \frac{\sum(A_i + B_i) - cnf \times 2}{8} - drk \quad (7)$$

$$= \frac{\begin{array}{c}A_0 + A_{90} + A_{180} + A_{270} + \\ B_0 + B_{90} + B_{180} + B_{270} - \\ \left(\begin{array}{c}|(A_0 - B_0) - (A_{180} - B_{180})| + \\ |(A_{90} - B_{90}) - (A_{270} - B_{270})|\end{array}\right) \times 2\end{array}}{8} - drk$$

The dark current component drk is, for example, a fixed value acquired in advance by acquiring the detection signals A and B in a state where the light receiving unit 21 is shielded.

Formula (7) is a formula for obtaining the ambient light component amb in the 4-phase method. However, even in the 2-phase method, the ambient light component amb can be calculated similarly by omitting the detection signals $A_i$ and $B_i$ that have not been measured and changing the denominator of the fraction to 4.

Returning to FIG. 7, the ambient light normalization unit 24 normalizes the ambient light component amb of the measurement target pixel supplied from the ambient light calculation unit 23 by using the number of pixels and the exposure time.

Specifically, the ambient light normalization unit 24 normalizes the ambient light component amb of the measurement target pixel supplied from the ambient light calculation unit 23 by using Formula (8) to calculate an ambient light component $amb_{norm}$ that has been normalized.

[Mathematical Expression 5]

$$amb_{norm} = \frac{\sum amb}{pix\_n} \times \frac{current\_exp\_time}{base\_exp\_time} \quad (8)$$

In Formula (8), Σamb represents the sum of the ambient light components amb of all the pixels of the pixel array unit 32, and pix_n represents the number of pixels of the pixel array unit 32. Furthermore, base_exp_time represents a basic exposure time preset as an initial value, and current_exp_time represents a current exposure time of the measurement target pixel supplied from the light emission controlling unit 13.

Furthermore, the ambient light normalization unit 24 may acquire the depth value d of the measurement target pixel from the distance measuring unit 22, and normalize the ambient light component amb by using the number of pixels, the exposure time, and the depth value. In this case, the ambient light component $amb_{norm}$ that has been normalized is calculated by the following Formula (9).

[Mathematical Expression 6]

$$amb_{norm} = \frac{\sum amb}{pix\_n} \times \frac{current\_exp\_time}{base\_exp\_time} \times d^2 \quad (9)$$

By normalizing the ambient light component amb, individual adjustment based on the number of pixels, exposure time, distance, or the like becomes unnecessary. The ambient light normalization unit 24 supplies the ambient light component $amb_{norm}$ that has been calculated, the ambient light component $amb_{norm}$ having been normalized, to the outdoor information calculation unit 25.

The outdoor information calculation unit 25 calculates outdoor information on whether the current environment that is being measured by the distance measuring module 11 is outdoors on the basis of the ambient light component $amb_{norm}$ that has been normalized, the ambient light component $amb_{norm}$ having been supplied from the ambient light normalization unit 24, and supplies the outdoor information to the filtering unit 26. The outdoor information may be a probability of being outdoors (hereinafter referred to as an outdoor probability), or may be a binary value indicating outdoors or indoors. In a case where the outdoor information is represented by a binary value, it is only required to perform outdoor judgment by using 50% as a threshold. In the present embodiment, a description will be given assuming that the outdoor information calculation unit 25 calculates and outputs an outdoor probability as outdoor information.

For example, the outdoor information calculation unit 25 calculates the outdoor probability α (≤α≤1) of the measurement target pixel by the following Formula (10).

$$\alpha = a \times amb_{norm} + b \quad (10)$$

a and b in Formula (10) are predetermined constants determined in advance.

On the basis of the outdoor probability a as the outdoor information supplied from the outdoor information calculation unit 25, the filtering unit 26 performs optimum filtering process on the distance measurement result from the distance measuring unit 22.

Specifically, for the measurement target pixel, if the outdoor probability α as the outdoor information is supplied from the outdoor information calculation unit 25 and the depth value d and the reliability cnf are supplied from the distance measuring unit 22, the filtering unit 26 calculates the depth value d' and the reliability cnf' that has been filtered, by the following Formula (11).

$$d' = \alpha \cdot f_1(d) + (1-\alpha) \cdot f_2(d)$$

$$cnf' = \alpha \cdot g_1(cnf) + (1-\alpha) \cdot g_2(cnf) \quad (11)$$

Here, $f_1(\ )$ represents a parameter set of the outdoor filter with the depth value d as an input, and $f_2(\ )$ represents a parameter set of the indoor filter with the depth value d as an input. $g_1(\ )$ represents a parameter set of the outdoor filter with the reliability cnf as an input, and $g_2(\ )$ represents a parameter set of the indoor filter with the reliability cnf as an input. The outdoor filter or the indoor filter is a filter obtained by adjusting any filter such as a filter for noise reduction or a filter for sharpening a boundary portion of an object for outdoor or indoor use. In a case where the outdoor information is a binary value indicating outdoors or indoors, a is 1 or 0. Therefore, either the outdoor filter or the indoor filter is selected.

The filtering unit 26 outputs the depth value d' and the reliability cnf' that have been filtered to the outside of the distance measuring module 11 as the depth value and the reliability of the measurement target pixel.

Note that the filtering unit 26 may generate map data in which the depth value d' or the reliability cnf' is stored as the pixel value of each pixel 31 of the pixel array unit 32, and output the map data to the subsequent stage. In this case, a depth map in which the depth value d' is stored as the pixel value of each pixel 31 of the pixel array unit 32 and a reliability map in which the reliability cnf' is stored as the pixel value of each pixel 31 of the pixel array unit 32 are generated and output.

4. Depth Value Calculation Process

The depth value calculation process performed by the distance measuring module 11 will be described with reference to the flowchart of FIG. 10. This process is started, for example, when a light emission control signal is supplied from the light emission controlling unit 13 to the light emitting source 12 and the distance measuring sensor 14.

First, in step S1, the light receiving unit 21 receives reflected light on the basis of the light emission control signal from the light emission controlling unit 13. Specifically, the light receiving unit 21 receives reflected light by changing the phase in a time division manner so that light receiving timings of each pixel 31 of the pixel array unit 32 are in the phases of 0°, 90°, 180°, and 270° with respect to the irradiation timing of the irradiation light, respectively. The detection signals $A_0$ to $A_{270}$ and the detection signals $B_0$ to $B_{270}$ of each pixel obtained by sequentially setting the phase to 0°, 90°, 180°, and 270° are supplied to the light emission controlling unit 13, the distance measuring unit 22, and the ambient light calculation unit 23 as RAW data.

In step S2, the distance measuring unit 22 sequentially sets the respective pixels 31 of the pixel array unit 32 as a measurement target pixel, calculates the depth value d and the reliability cnf of the measurement target pixel on the basis of the RAW data of the measurement target pixel supplied from the light receiving unit 21, and supplies the depth value d and the reliability cnf to the filtering unit 26. The depth value d can be calculated by Formula (1), and the reliability cnf can be calculated by Formula (6), respectively.

In step S3, the ambient light calculation unit 23 calculates the ambient light component amb included in the RAW data of the measurement target pixel supplied from the light receiving unit 21, and supplies the ambient light component amb to the ambient light normalization unit 24. The ambient light component amb can be obtained by the following Formula (7).

In step S4, the ambient light normalization unit 24 normalizes the ambient light component amb of the measurement target pixel supplied from the ambient light calculation unit 23 by using the number of pixels and the exposure time. For example, the ambient light normalization unit 24 calculates the normalized ambient light component $amb_{norm}$ by Formula (8), and supplies the ambient light component $amb_{norm}$ that has been normalized to the outdoor information calculation unit 25. Note that, as described above, the ambient light component $amb_{norm}$ that has been normalized can also be calculated by Formula (9).

In step S5, the outdoor information calculation unit 25 calculates outdoor information on whether the current environment that is being measured by the distance measuring module 11 is outdoors on the basis of the ambient light component $amb_{norm}$ that has been normalized, the ambient light component $amb_{norm}$ having been supplied from the ambient light normalization unit 24, and supplies the outdoor information to the filtering unit 26. For example, the outdoor information calculation unit 25 calculates the outdoor probability a of the measurement target pixel by the Formula (10) described above.

In step S6, the filtering unit 26 performs an optimum filtering process on the distance measurement result from the distance measuring unit 22 according to the outdoor probability a as the outdoor information supplied from the outdoor information calculation unit 25. Specifically, with respect to the depth value d and the reliability cnf of the measurement target pixel from the distance measuring unit 22, the filtering unit 26 calculates the depth value d' and the reliability cnf' that have been filtered by using Formula (11). The depth value d' and the reliability cnf' that have been filtered are output to the outside of the distance measuring module 11 as the depth value of the measurement target pixel and the reliability.

The processes of steps S2 to S6 is executed for all the pixels 31 of the pixel array unit 32 by sequentially setting the respective pixels 31 of the pixel array unit 32 as a measurement target pixel.

In step S7, the light emission controlling unit 13 sets the next exposure time on the basis of the RAW data supplied from the light receiving unit 21. The process of step S7 can be executed in parallel with steps S2 to S6.

Thus, the depth value calculation process performed by the distance measuring module 11 has been completed.

In the depth value calculation process described above, both the distance information (depth value d, reliability cnf) to the object and outdoor information are calculated from the detection signals obtained in each pixel 31 of the pixel array unit 32, and the process of reflecting the outdoor information (outdoor probability) in the distance information is executed. However, in addition to the distance information, the outdoor information that has been calculated may also be output to the outside.

Furthermore, the distance measuring sensor 14 can also perform operation of outputting only one of distance information and outdoor information.

Specifically, the distance measuring sensor 14 includes, as operation modes, a first operation mode for calculating both distance information and outdoor information, a second operation mode for calculating distance information without calculating outdoor information and outputting only distance information, and a third operation mode for calculating only outdoor information without calculating distance information, and performs the process according to the operation mode specified by a setting screen or a setting control signal.

Figure 10:
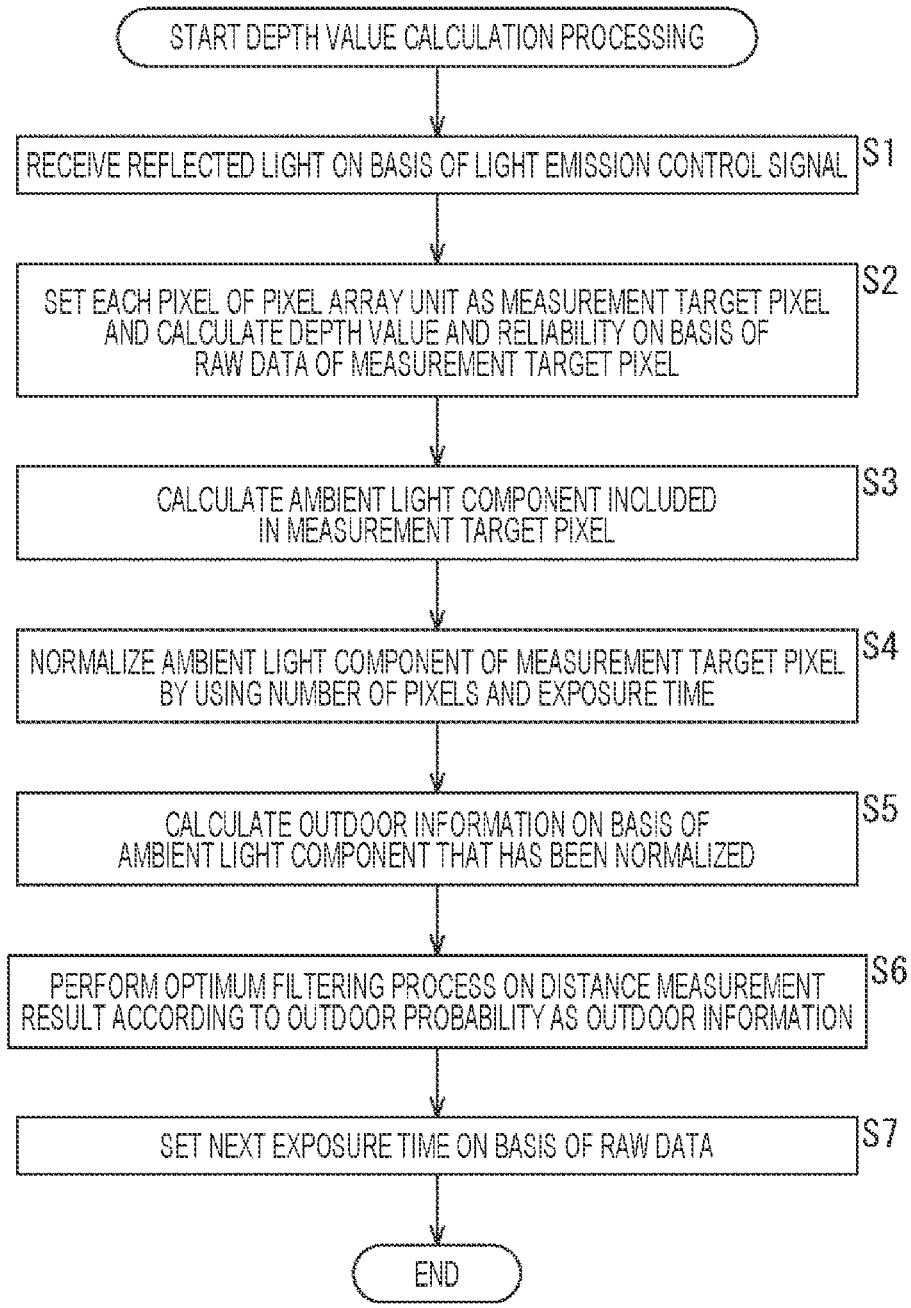
FIG. 10 is a flowchart illustrating a depth value calculation process performed by the distance measuring module.

In the first operation mode, the distance measuring sensor 14 executes the depth value calculation process illustrated in FIG. 10.

Figure 11:
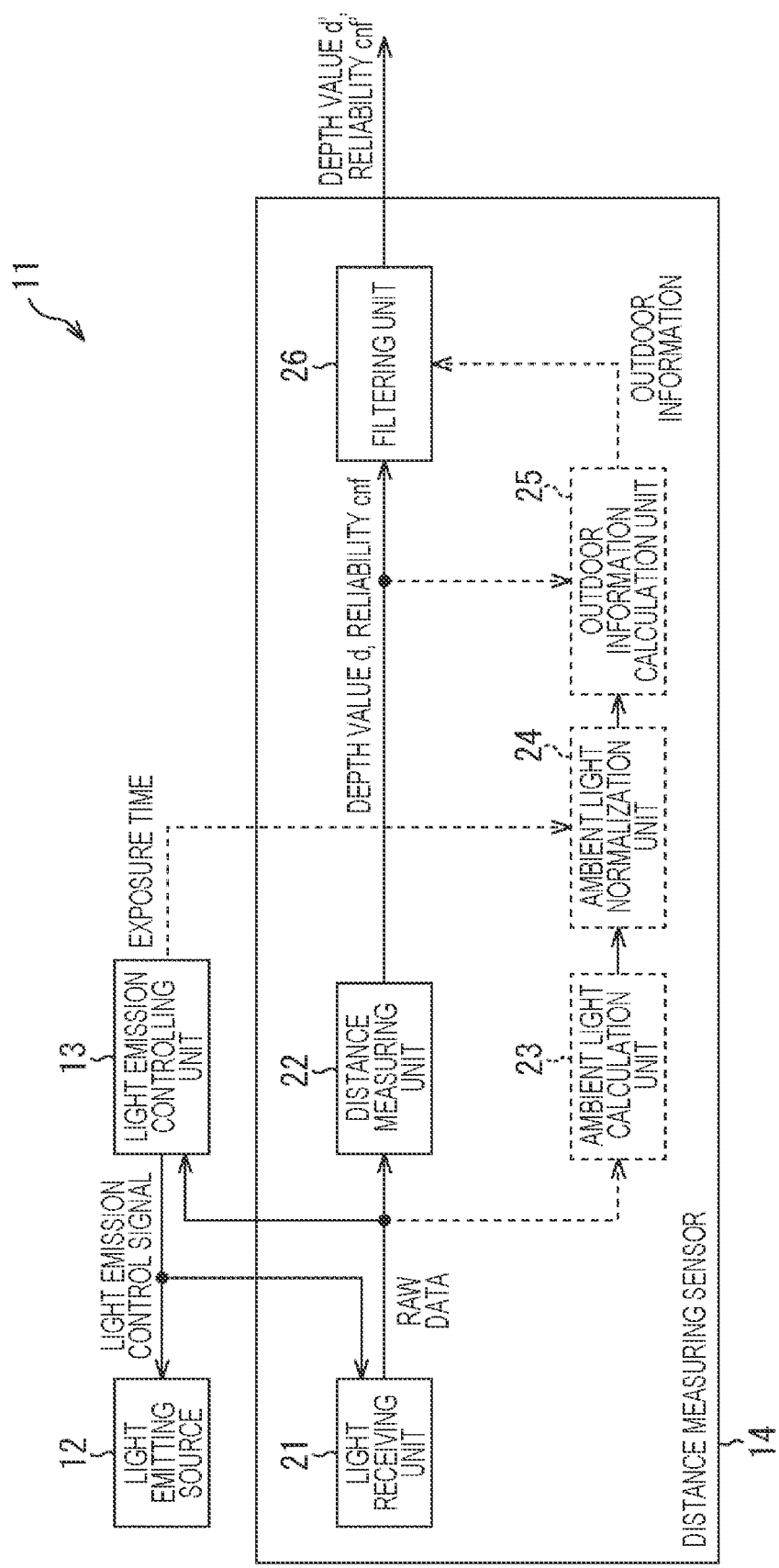
FIG. 11 is a diagram explaining a second operation mode of the distance measuring module.

In the second operation mode, the distance measuring sensor 14 causes the light receiving unit 21, the distance measuring unit 22, and the filtering unit 26 indicated by solid lines in FIG. 11 to operate, calculates distance information without calculating outdoor information, and outputs only the distance information. The filtering unit 26 performs, for example, a predetermined filtering process determined in advance.

Figure 12:
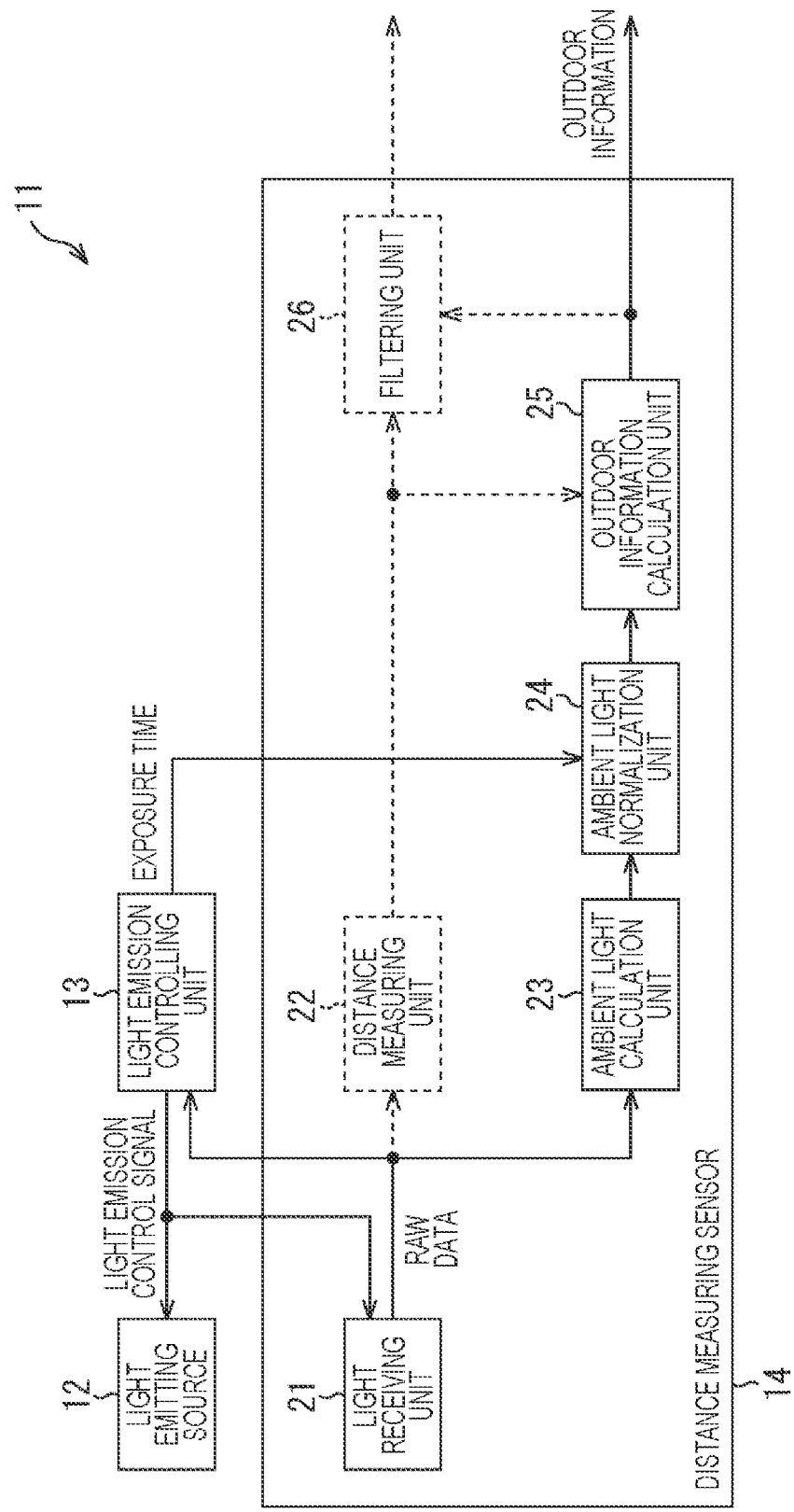
FIG. 12 is a diagram explaining a third operation mode of the distance measuring module.

In the third operation mode, the distance measuring sensor 14 causes the light receiving unit 21, the ambient light calculation unit 23, the ambient light normalization unit 24, and the outdoor information calculation unit 25 indicated by solid lines in FIG. 12 to operate, and calculates outdoor information without calculating distance information. In this case, the distance measuring sensor 14 operates as an outdoor judgment sensor. As compared with an outdoor judgment sensor using a general RGB sensor that receives RGB light, since the resolution of the pixel array unit 32 can be made lower, the drive power can be suppressed, and outdoor judgment can be realized with lower power consumption.

As described above, according to the distance measuring sensor 14 and the distance measuring module 11, calculation of distance information and outdoor judgment can be performed by the distance measuring sensor alone. Since calculation of distance information and outdoor judgment can be performed by the distance measuring sensor 14 alone and the distance measuring module 11, it is possible to reduce power consumption and the installation volume. Since the distance measuring sensor 14 receives infrared light that cannot be imaged by an RGB camera, the presence of the sun can be detected with higher accuracy than imaging by the RGB camera.

5. Second Embodiment

FIG. 13 illustrates a block diagram of a second embodiment of the distance measuring module.

In FIG. 13, portions corresponding to those in FIG. 7 in the first embodiment are denoted by the same reference signs, and description thereof will be omitted as appropriate.

The second embodiment of FIG. 13 is configured similarly to the first embodiment illustrated in FIG. 7 except that a subject region detecting unit 81 is newly provided and that the ambient light calculation unit 23 is changed to an ambient light calculation unit 82.

The depth value d and the reliability cnf of each pixel 31 of the pixel array unit 32 are supplied from the distance measuring unit 22 to the subject region detecting unit 81.

The subject region detecting unit 81 generates a reliability map in which the reliability cnf is stored as the pixel value of each pixel 31 of the pixel array unit 32. Then, the subject region detecting unit 81 detects a subject area that is a region including a subject (object) in the entire pixel region (hereinafter also referred to as a light receiving region) of the pixel array unit 32 on the basis of the reliability map that has been generated, and supplies the subject region that has been detected to the ambient light calculation unit 82 as region of interest (ROI) information indicating a region of interest that is a region to be focused on in the light receiving region.

Note that the subject region detecting unit 81 may also generate a depth map in which the depth value d is stored as the pixel value of each pixel 31 of the pixel array unit 32, and detect a subject region by also using the depth map. By also using distance information, a subject region can be detected more accurately. Alternatively, a subject region may be detected by using only the depth map without using the reliability map.

The ambient light calculation unit 82 performs a process similar to that in the first embodiment regarding a region of interest indicated by ROI information supplied from the subject region detecting unit 81 in the light receiving region. That is, the ambient light calculation unit 82 calculates the ambient light component amb included in RAW data for each pixel 31 in the region of interest, and supplies the ambient light component amb to the ambient light normalization unit 24.

Furthermore, the ambient light calculation unit 82 can also receive ROI information indicating the region of interest from the outside of the distance measuring sensor 14 or the like. In a case where ROI information is supplied, the ambient light calculation unit 82 calculates the ambient light component amb included in the RAW data for the region of interest indicated by the ROI information in the light receiving region, and supplies the ambient light component amb to the ambient light normalization unit 24.

Figure 14B:
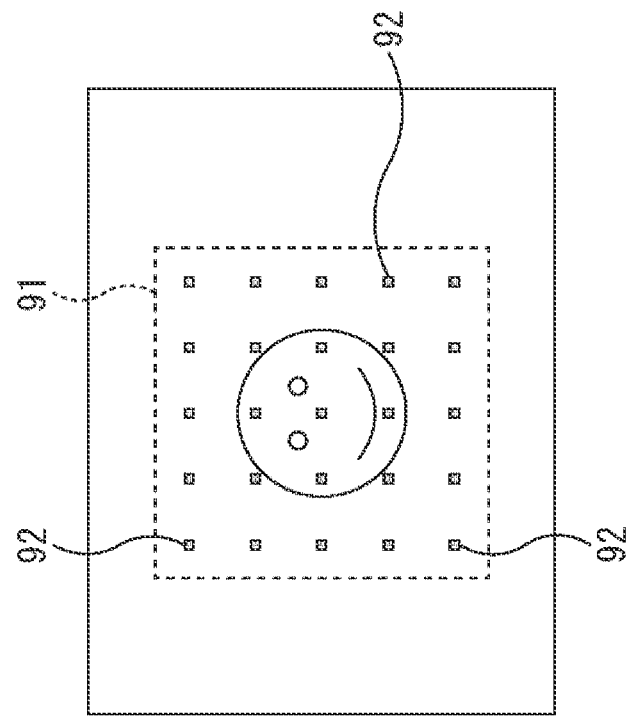
FIGS. 14A and 14B are diagrams explaining processing of an ambient light calculation unit according to the second embodiment.
Figure 14A:
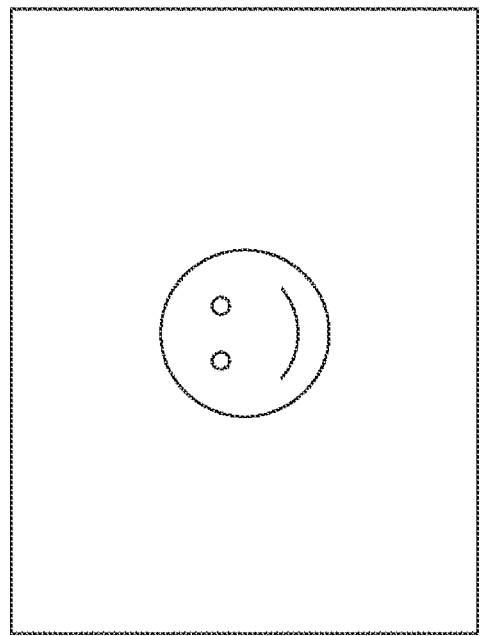

FIGS. 14A and 14B are diagrams for explaining processing of the ambient light calculation unit 82.

FIG. 14A illustrates an example of the reliability map in which the reliability cnf of each pixel 31 supplied from the distance measuring unit 22 is stored.

Note that since the reliability map is actually a grayscale image, A of FIG. 14A is a conceptual diagram of the reliability map.

For example, region information indicating the region 91 of FIG. 14B is supplied as ROI information to the reliability map illustrated in FIG. 14A. In a case where the region information indicating the region 91 is the subject region detected by the subject region detecting unit 81, the region 91 can dynamically change according to motion of the subject. Alternatively, in a case where region information indicating the region 91 is ROI information supplied from the outside, the region 91 is fixed unless the ROI information is updated.

The ambient light calculation unit 82 calculates the ambient light components amb of all the pixels in the region 91 in the entire region of the reliability map. Alternatively, the ambient light calculation unit 82 may calculate the ambient light component amb only for a predetermined sampling pixel 92 in the region 91. The sampling pixel 92 in this case is determined in advance by a parameter or the like.

As described above, the ambient light calculation unit 82 acquires ROI information indicating part of the region of interest in the entire region of the light receiving region, calculates the ambient light component amb of the region of interest, and supplies the ambient light component amb to the ambient light normalization unit 24.

The ambient light normalization unit 24 and the outdoor information calculation unit 25 in FIG. 13 perform processing similar to that of the first embodiment regarding the region of interest. That is, the ambient light normalization unit 24 normalizes the ambient light component amb of each pixel 31 in the region of interest, and supplies the ambient light component $amb_{norm}$ that has been normalized to the outdoor information calculation unit 25. The outdoor information calculation unit 25 calculates outdoor information of each pixel 31 in the region of interest and supplies the outdoor information to the filtering unit 26.

The filtering unit 26 performs processing similar to that of the first embodiment regarding the region of interest. That is, the filtering unit 26 performs optimum filtering process on the distance measurement result from the distance measuring unit 22 on the basis of the outdoor information of each pixel 31 in the region of interest. Note that, regarding a region other than the region of interest in the entire region of the light receiving region, the value from the distance measuring unit 22 may be used as it is, or processing in accordance with the filtering process of the region of interest, for example, the average filtering process of the filtering processes performed on the respective pixels of the region of interest, or the like may be performed.

Since the depth value calculation process in the second embodiment is basically similar to the depth value calculation process in the first embodiment described with reference to FIG. 10, detailed description thereof will be omitted. In the depth value calculation process in the second embodiment, between steps S2 and S3 in FIG. 10, a subject region detection process performed by the subject region detecting unit 81 or the process of acquiring ROI information from the outside by the ambient light calculation unit 82 is added. Then, in steps S4 to S6, the ambient light component amb is calculated for the pixel 31 in the region of interest, the ambient light component amb that has been calculated is normalized, and outdoor information is calculated. The rest of the process is similar to the depth value calculation process of the first embodiment described with reference to FIG. 10.

6. Third Embodiment

Figure 15:
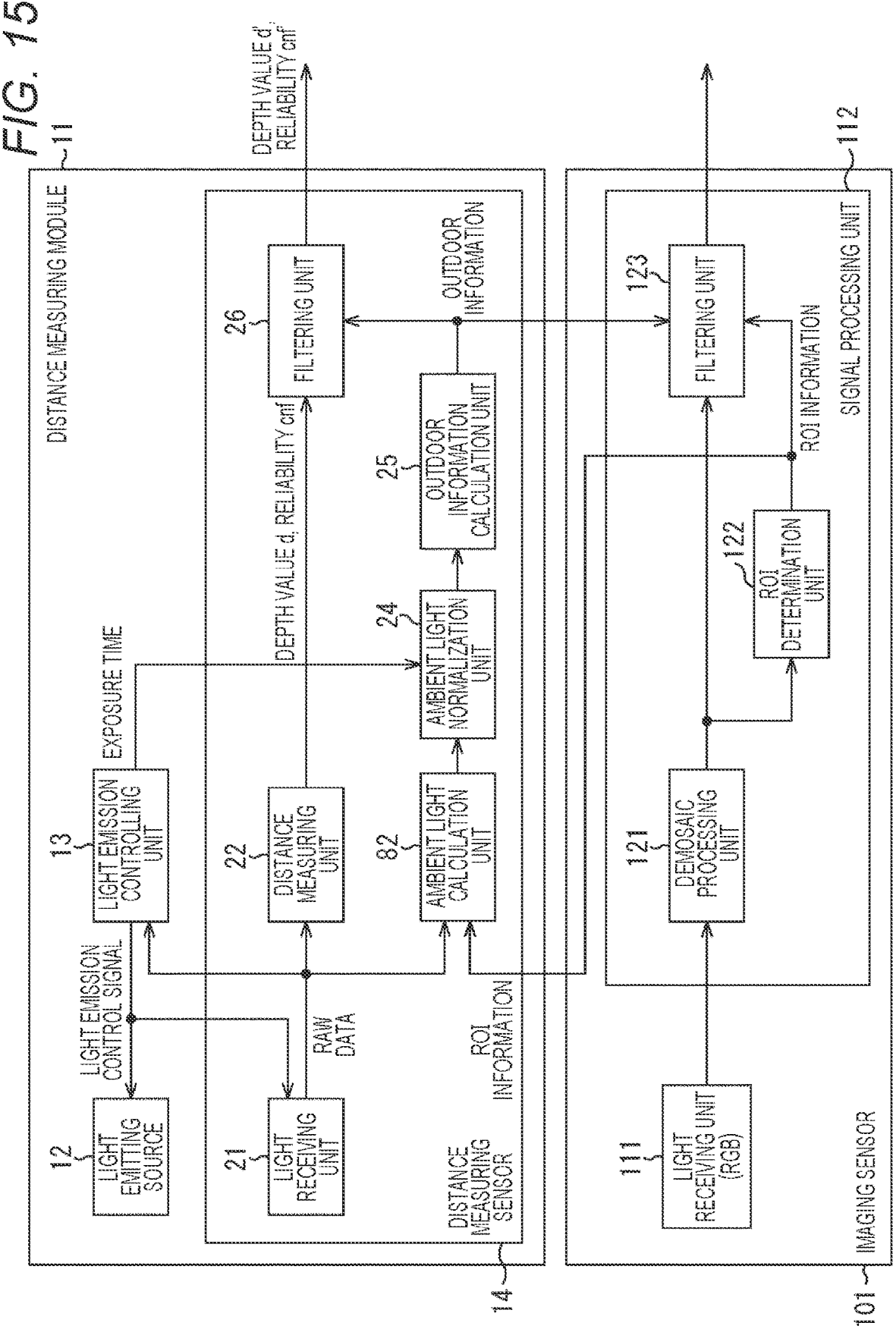
FIG. 15 is a block diagram of a third embodiment of the distance measuring module.

FIG. 15 is a block diagram of a third embodiment of the distance measuring module.

In FIG. 15, portions corresponding to those in the second embodiment illustrated in FIG. 13 are denoted by the same reference signs, and description thereof will be omitted as appropriate.

In the third embodiment of FIG. 15, an imaging sensor 101 is provided in addition to a distance measuring module 11. The imaging sensor 101 is an image sensor that receives light of RGB wavelengths and generates an image (RGB image) of a subject. The distance measuring module 11 and the imaging sensor 101 in FIG. 15 constitute a distance measuring system (imaging system).

The imaging sensor 101 includes a light receiving unit 111 and a signal processing unit 112, and the signal processing unit 112 includes a demosaic processing unit 121, an ROI determination unit 122, and a filtering unit 123.

The distance measuring module 11 illustrated in FIG. 15 is different from the distance measuring module 11 of the second embodiment illustrated in FIG. 13 in that the subject region detecting unit 81 is omitted. ROI information generated by an ROI determination unit 122 of the imaging sensor 101 is supplied to an ambient light calculation unit 82. Furthermore, outdoor information generated by an outdoor information calculation unit 25 is supplied to a filtering unit 26 and is also supplied to the filtering unit 123 of the imaging sensor 101. The other part of the distance measuring module 11 of the third embodiment is similar to that of the second embodiment described above.

The light receiving unit 111 includes a pixel array unit in which respective pixels on which red (R), green (G), or blue (B) color fills are arranged in a Bayer array or the like are two-dimensionally arranged, and supplies a signal obtained by photoelectrically converting light of the R, G, or B wavelength received by each pixel to the demosaic processing unit 121 as an imaging signal.

The demosaic processing unit 121 generates an image signal including pixel signals of an R signal, a G signal, and a B signal for each pixel by performing color information interpolation processing or the like using the pixel signal of any of the pixel signals of the R signal, the G signal, and the B signal supplied from the light receiving unit 111, and supplies the image signal to the ROI determination unit 122 and the filtering unit 123.

The ROI determination unit 122 executes a region-of-interest determination process for determining a region of interest on the image signal supplied from the demosaic processing unit 121. The ROI determination unit 122 performs processing similar to that of the subject region detecting unit 81 except that the processing target image is not a grayscale image but an RGB image. It is needless to say that the ROI determination unit 122 may determine the region of interest by processing different from that of the subject region detecting unit 81. The ROI determination unit 122 supplies ROI information indicating the region of interest obtained as a result of the region-of-interest determination process to the filtering unit 123 and the ambient light calculation unit 82 of the distance measuring sensor 14.

An image signal is supplied from the demosaic processing unit 121 and the ROI information is supplied from the ROI determination unit 122 to the filtering unit 123. Furthermore, outdoor information is also supplied from the outdoor information calculation unit 25 of the distance measuring sensor 14 to the filtering unit 123.

The filtering unit 123 performs optimum filtering processing on the image signal of the region of interest among the image signals from the demosaic processing unit 121 on the basis of the outdoor information of the region of interest. Note that the region other than the region of interest in the image captured by the light receiving unit 111 may be left as it is, or processing in accordance with the filtering process of the region of interest, for example, the average filtering process of the filtering processes performed on the respective pixels of the region of interest, or the like may be performed.

The filtering unit 123 outputs a filtered image signal obtained by applying a predetermined filtering process to at least the region of interest to the outside.

Since the depth value calculation process of the distance measuring module 11 is similar to the depth value calculation process of the second embodiment described above, the description thereof will be omitted.

As described above, according to the third embodiment, the distance measuring module 11 can calculate the ambient light component amb on the basis of ROI information detected by the imaging sensor 101 that receives RGB light and generates a captured image, and output a depth value d' and a reliability cnf'. Furthermore, since the filtering unit 123 of the imaging sensor 101 performs appropriate filtering process on an RGB image signal on the basis of outdoor information, for example, it is possible to optimally control adjustment of the color tone and the edge according to the scene or the like.

The distance measuring module 11 in FIG. 1 can be applied to, for example, an in-vehicle system that is mounted on a vehicle and measures the distance to a target outside the vehicle. Furthermore, for example, the distance measuring module 11 in FIG. 1 can be applied to a gesture recognition system or the like that measures a distance to a target such as a hand of the user and recognizes the gesture of the user on the basis of the measurement result.

7. Configuration Example of Electronic Apparatus

The distance measuring module 11 described above can be mounted on, for example, an electronic apparatus such as a smartphone, a tablet terminal, a mobile phone, a personal computer, a game console, a television receiver, a wearable terminal, a digital still camera, or a digital video camera.

Figure 16:
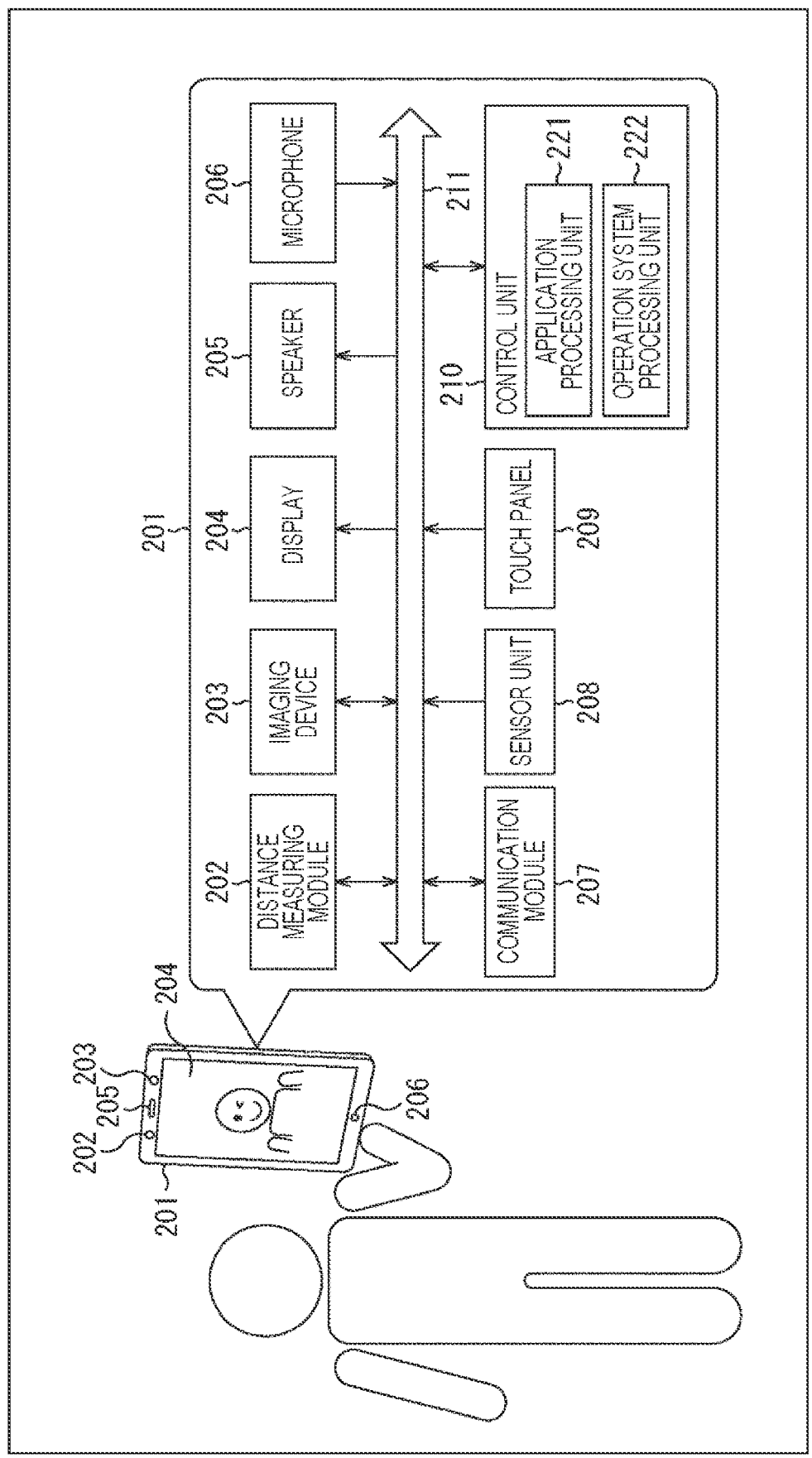
FIG. 16 is a block diagram illustrating a configuration example of an electronic apparatus to which the present technology is applied.

FIG. 16 is a block diagram illustrating a configuration example of a smartphone as an electronic apparatus on which a distance measuring module is mounted.

As illustrated in FIG. 16, a smartphone 201 is configured by connecting a distance measuring module 202, an imaging device 203, a display 204, a speaker 205, a microphone 206, a communication module 207, a sensor unit 208, a touch panel 209, and a control unit 210 via a bus 211. Furthermore, execution of a program by the CPU allows the control unit 210 to have functions as an application processing unit 221 and an operation system processing unit 222.

The distance measuring module 11 in FIG. 1 is applied to the distance measuring module 202. For example, the distance measuring module 202 is arranged on a front surface of the smartphone 201, and performs distance measurement for the user of the smartphone 201, so that the depth value of the surface shape of the face, a hand, a finger, or the like of the user can be output as the distance measurement result.

The imaging device 203 is arranged on the front surface of the smartphone 201, and performs imaging with the user of the smartphone 201 as a subject to acquire an image of the user. Note that although not illustrated, a configuration in which the imaging device 203 may also be disposed on the back surface of the smartphone 201 may be adopted.

The display 204 displays an operating screen for performing processing by the application processing unit 221 and the operation system processing unit 222, an image captured by the imaging device 203, and the like. The speaker 205 and the microphone 206 output the voice of the other party and collect the voice of the user, for example, when a call is made by using the smartphone 201.

The communication module 207 performs communication via a communication network. The sensor unit 208 senses speed, acceleration, proximity, or the like, and the touch panel 209 acquires a touch operation by the user on the operating screen displayed on the display 204.

The application processing unit 221 performs processing for providing various services by the smartphone 201. For example, the application processing unit 221 can perform processing of creating a face by computer graphics virtually reproducing the expression of the user on the basis of the depth supplied from the distance measuring module 202 and displaying the face on the display 204. Furthermore, the application processing unit 221 can perform processing of creating three-dimensional shape data of an arbitrary stereoscopic object on the basis of the depth supplied from the distance measuring module 202, for example.

The operation system processing unit 222 performs processing for realizing basic functions and operation of the smartphone 201. For example, the operation system processing unit 222 can perform processing of authenticating the user's face and unlocking the smartphone 201 on the basis of the depth value supplied from the distance measuring module 202.

Furthermore, on the basis of the depth value supplied from the distance measuring module 202, the operation system processing unit 222 can perform, for example, processing of recognizing a gesture of the user and processing of inputting various operations according to the gesture.

In the smartphone 201 configured as described above, for example, calculation of distance measurement information and outdoor judgment can be simultaneously performed by applying the distance measuring module 11 described above. Therefore, the smartphone 201 can more accurately detect distance measurement information.

8. Configuration Example of Computer

Next, the series of processes described above can be performed by hardware or can be performed by software. In a case where the series of processes are performed by software, a program that configures the software is installed on a general computer or the like.

Figure 17:
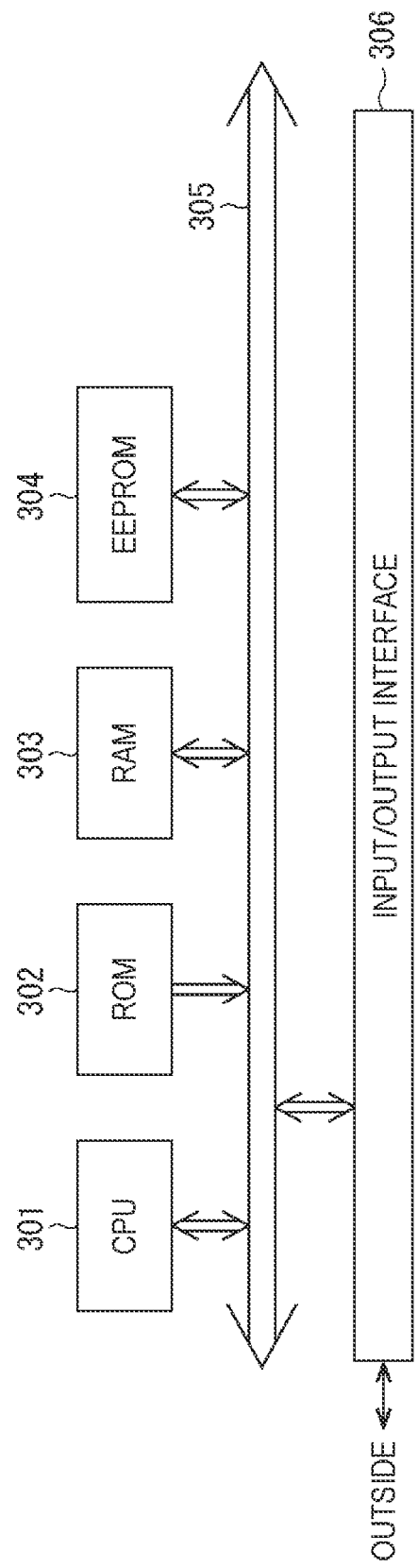
FIG. 17 is a block diagram illustrating a configuration example of an embodiment of a computer to which the present technology is applied.

FIG. 17 is a block diagram illustrating a configuration example of an embodiment of a computer in which a program for executing the series of processes described above is installed.

In the computer, a central processing unit (CPU) 301, a read only memory (ROM) 302, a random access memory (RAM) 303, and an electronically erasable and programmable read only memory (EEPROM) 304 are mutually connected by a bus 305. Furthermore, an input/output interface 306 is connected to the bus 305, and the input/output interface 306 is connected to the outside.

In the computer configured as described above, for example, the CPU 301 loads the program stored in the ROM 302 and the EEPROM 304 into the RAM 303 via the bus 305 and executes the program, and thus the series of processes described above are performed. Furthermore, the program executed by the computer (CPU 301) can be written in the ROM 302 in advance, installed in the EEPROM 304 from the outside via the input/output interface 306, or updated.

Therefore, the CPU 301 performs the processing according to the flowchart described above or the processing performed by the configuration of the block diagram described above. Then, the CPU 301 can output the processing result to the outside via the input/output interface 306, for example, as necessary.

In the present Description, the processes performed by the computer according to the program do not necessarily have to be performed in time series in the order described as the flowchart. That is, the processes performed by the computer according to the program also include processes executed in parallel or individually (for example, parallel processing or processing by an object).

Furthermore, the program may be processed by one computer (processor) or may be subjected to distributed processing by a plurality of computers. Moreover, the program may be transferred to a remote computer and executed.

9. Example of Application to Moving Object

The technology according to the present disclosure (present technology) can be applied to various products. For example, the technology according to the present disclosure may be realized as a device mounted on any type of a moving object such as an automobile, an electric car, a hybrid electric car, a motorcycle, a bicycle, a personal mobility vehicle, an airplane, a drone, a ship, or a robot.

Figure 18:
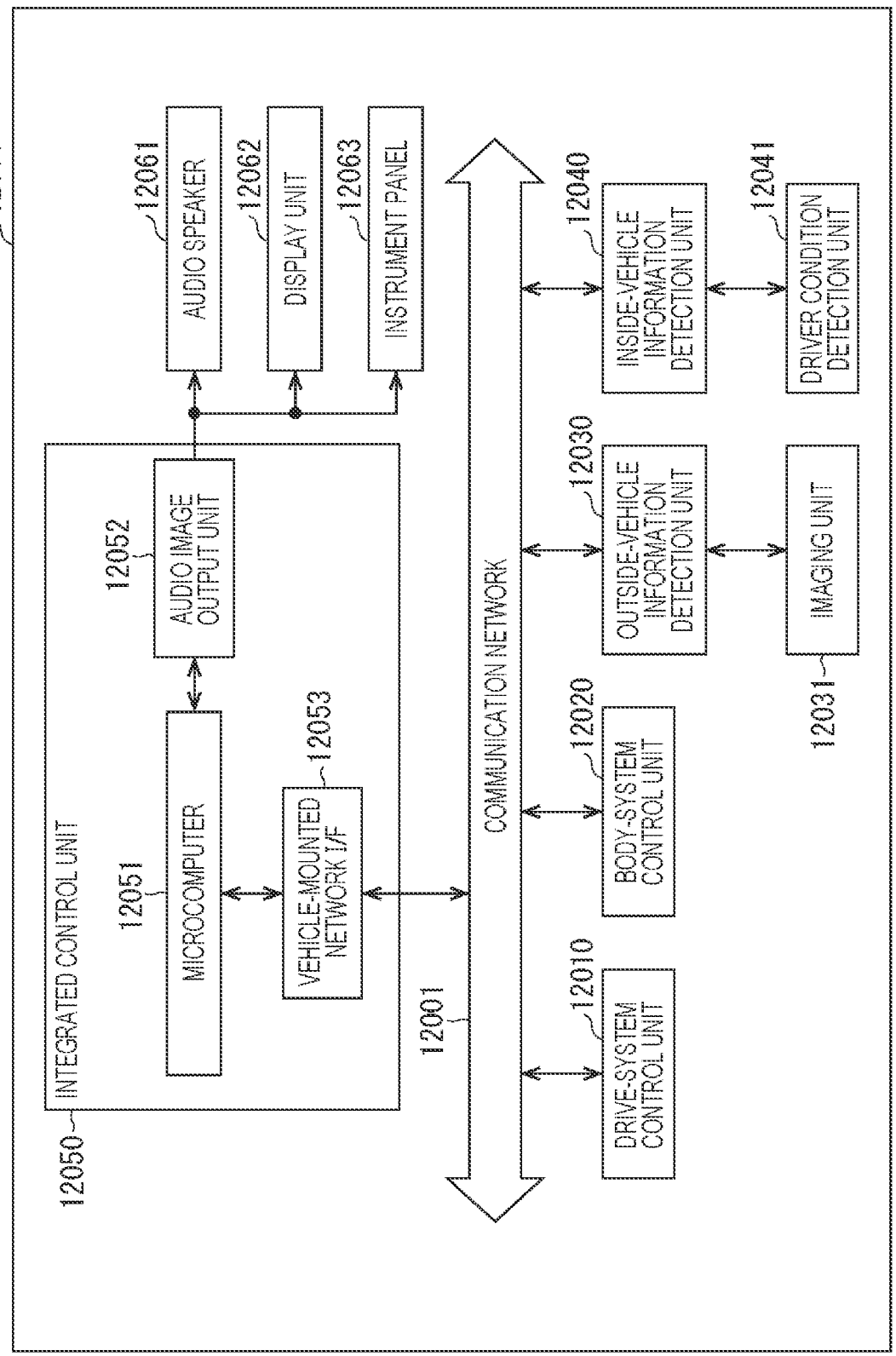
FIG. 18 is a block diagram illustrating an example of a schematic configuration of a vehicle control system.

FIG. 18 is a block diagram illustrating a schematic configuration example of a vehicle control system which is an example of a moving object control system to which the technology according to the present disclosure can be applied.

A vehicle control system 12000 includes a plurality of electronic control units connected via a communication network 12001. In the example illustrated in FIG. 18, the vehicle control system 12000 includes a drive-system control unit 12010, a body-system control unit 12020, an outside-vehicle information detection unit 12030, an inside-vehicle information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive-system control unit 12010 controls the operation of devices related to the drive system of a vehicle according to various programs. For example, the drive-system control unit 12010 functions as a control device for a drive force generation device for generating drive force of the vehicle such as an internal combustion engine or a drive motor, a drive force transmission mechanism for transmitting drive force to wheels, a steering mechanism that adjusts the steering angle of the vehicle, and a braking device that generates braking force of the vehicle.

The body-system control unit 12020 controls the operation of various devices provided on a vehicle body according to the various programs. For example, the body-system control unit 12020 functions as a control device for a keyless entry system, a smart key system, a power window device, or various lamps such as a headlamp, a back lamp, a brake lamp, a blinker, or a fog lamp. In this case, to the body-system control unit 12020, radio waves or signals of various switches transmitted from a portable machine substituting for a key can be input. The body-system control unit 12020 receives input of these radio waves or signals, and controls a door lock device, a power window device, a lamp, and the like of the vehicle.

The outside-vehicle information detection unit 12030 detects information of the outside of the vehicle on which the vehicle control system 12000 is mounted. For example, an imaging unit 12031 is connected to the outside-vehicle information detection unit 12030. The outside-vehicle information detection unit 12030 causes the imaging unit 12031 to capture an image outside the vehicle, and receives the captured image. The outside-vehicle information detection unit 12030 may perform a process of detecting an object such as a person, a car, an obstacle, a sign, a character on a road surface, or the like or a distance detection process on the basis of the received image.

The imaging unit 12031 is an optical sensor that receives light and outputs an electric signal according to the light reception amount of the light. The imaging unit 12031 can output an electric signal as an image or can output the electric signal as information of distance measurement. Furthermore, light received by the imaging unit 12031 may be visible light or invisible light such as infrared light.

The inside-vehicle information detection unit 12040 detects information of vehicle inside. For example, a driver condition detector 12041 that detects the condition of a driver is connected to the inside-vehicle information detection unit 12040. The driver condition detector 12041 includes, for example, a camera that captures an image of the driver, and the inside-vehicle information detection unit 12040 may calculate the degree of fatigue or the degree of concentration of the driver or may make a judgment as to whether or not the driver does not doze off, on the basis of detection information input from the driver condition detector 12041.

The microcomputer 12051 can arithmetically operate a control target value of the drive force generation device, the steering mechanism, or the braking device, on the basis of information of the inside and outside of the vehicle acquired by the outside-vehicle information detection unit 12030 or the inside-vehicle information detection unit 12040, and can output a control command to the drive-system control unit 12010. For example, the microcomputer 12051 can perform coordinated control aiming at realizing functions of an advanced driver assistance system (ADAS) including collision avoidance or shock mitigation of a vehicle, follow-up traveling based on inter-vehicle distance, traveling while maintaining vehicle speed, vehicle collision warning, vehicle lane deviation warning, or the like.

Furthermore, the microcomputer 12051 can perform coordinated control aiming at automatic driving or the like of autonomously traveling without depending on an operation of the driver, by controlling the drive force generation device, the steering mechanism, the braking device, or the like on the basis of vehicle periphery information acquired by the outside-vehicle information detection unit 12030 or the inside-vehicle information detection unit 12040.

Furthermore, the microcomputer 12051 can output a control command to the body-system control unit 12020 on the basis of the outside-vehicle information acquired by the outside-vehicle information detection unit 12030. For example, the microcomputer 12051 can perform coordinated control aiming at antiglare such as switching from a high beam to a low beam by controlling the headlamp according to the position of the preceding car or the oncoming car detected by the outside-vehicle information detection unit 12030.

The audio image output unit 12052 transmits an output signal of at least one of audio or an image to an output device capable of visually or aurally notifying a passenger or the outside of the vehicle of information. In the example of FIG. 18, an audio speaker 12061, a display unit 12062, and an instrument panel 12063 are illustrated as examples of the output device. For example, the display unit 12062 may include at least one of an on-board display or a head-up display.

Figure 19:
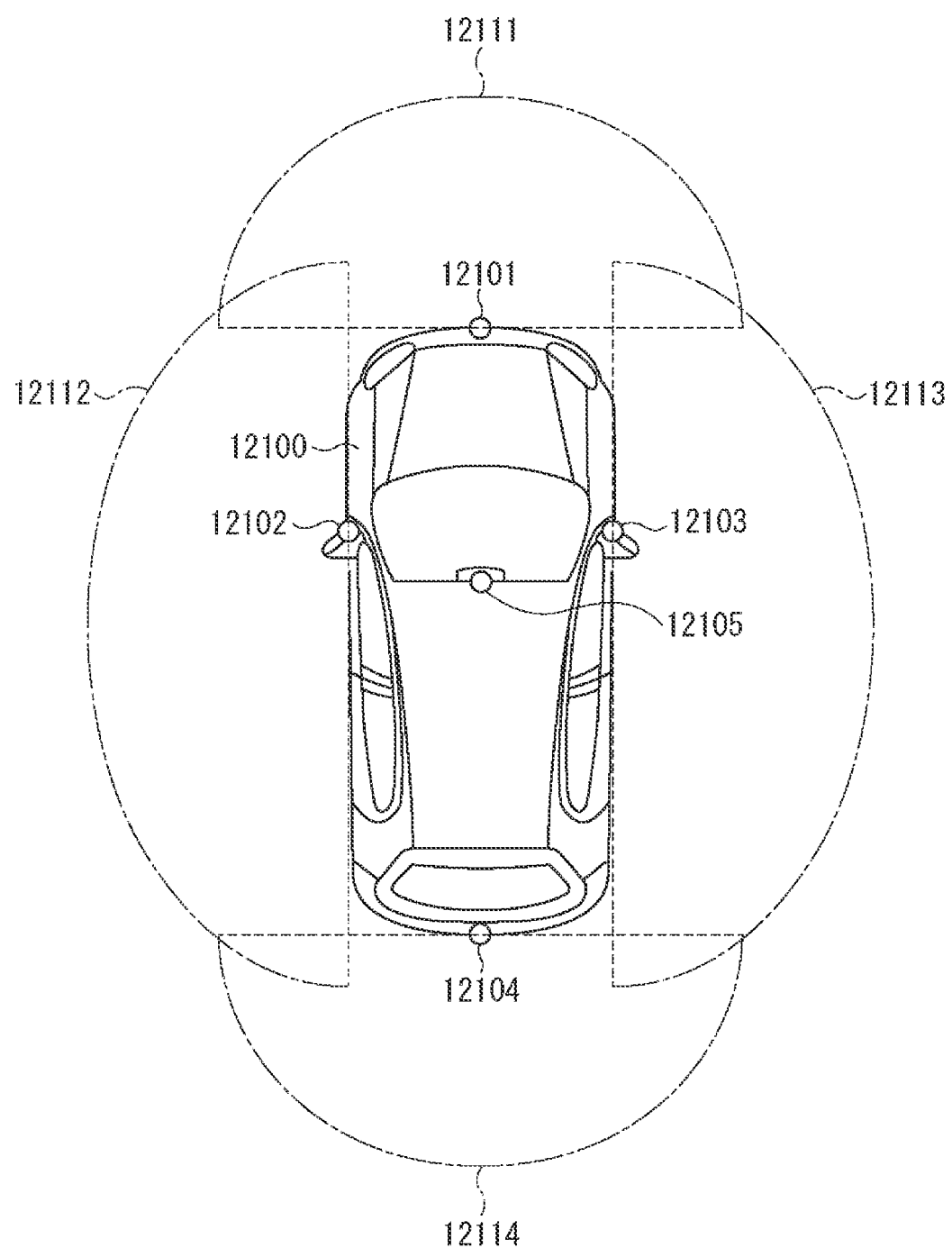
FIG. 19 is an explanatory view illustrating an example of installation locations of an outside-vehicle information detecting unit and imaging units.

FIG. 19 is a diagram illustrating examples of installation locations of the imaging unit 12031.

In FIG. 19, a vehicle 12100 includes imaging units 12101, 12102, 12103, 12104, 12105 as the imaging unit 12031.

For example, the imaging units 12101, 12102, 12103, 12104, 12105 are provided at locations such as a front nose, side mirrors, a rear bumper, a back door, and an upper portion of a windshield of a vehicle cabin of the vehicle 12100. The imaging unit 12101 provided on the front nose and the imaging unit 12105 provided on the upper portion of the windshield inside the vehicle cabin mainly acquire images in front of the vehicle 12100. The imaging units 12102, 12103 provided on the side mirrors mainly acquire images on lateral sides of the vehicle 12100. The imaging unit 12104 provided on the rear bumper or the back door mainly acquires an image behind the vehicle 12100. The front images acquired by the imaging units 12101, 12105 are mainly used to detect a preceding vehicle, a pedestrian, an obstacle, traffic lights, a traffic sign, a traffic lane, or the like.

Note that FIG. 19 illustrates examples of the imaging ranges of the imaging units 12101 to 12104. An imaging range 12111 indicates the imaging range of the imaging unit 12101 provided on the front nose, imaging ranges 12112, 12113 indicate the imaging ranges of the imaging units 12102, 12103 provided on the side mirrors, respectively, and an imaging range 12114 indicates the imaging range of the imaging unit 12104 provided on the rear bumper or the back door. For example, by overlapping pieces of image data captured by the imaging units 12101 to 12104, a bird's eye view of the vehicle 12100 viewed from above can be obtained.

At least one of the imaging units 12101 to 12104 may have a function of acquiring distance information. For example, at least one of the imaging units 12101 to 12104 may be a stereo camera including a plurality of imaging elements, or an imaging element having pixels for phase difference detection.

For example, the microcomputer 12051 can extract, in particular, a closest stereoscopic object on a traveling road of the vehicle 12100, the stereoscopic object traveling at predetermined speed (for example, 0 km/h or more) in substantially the same direction as in the vehicle 12100, as a preceding car, by determining the distance to each stereoscopic object in the imaging ranges 12111 to 12114 and the temporal change of the distance (relative speed with respect to the vehicle 12100), on the basis of the distance information obtained from the imaging units 12101 to 12104. Moreover, the microcomputer 12051 can set an inter-vehicle distance to be secured behind the preceding car, and can perform automatic brake control (including follow-up stop control), automatic acceleration control (including follow-up start control), or the like. As described above, it is possible to perform coordinated control aiming at automatic driving or the like of travelling autonomously without depending on the driver's operation.

For example, on the basis of the distance information obtained from the imaging units 12101 to 12104, the microcomputer 12051 can classify stereoscopic object data relating to stereoscopic objects into two-wheeled vehicles, ordinary vehicles, large vehicles, pedestrians, utility poles, and other stereoscopic objects and extract them so as to be able to use them for automatic avoidance of obstacles. For example, the microcomputer 12051 identifies obstacles around the vehicle 12100 as obstacles visible to the driver of the vehicle 12100 and as obstacles hardly visible to the driver of the vehicle 12100. Then, the microcomputer 12051 judges the collision risk indicating the degree of risk of collision with each obstacle, and in a situation where there is a possibility of collision with the collision risk equal to or more than a set value, the microcomputer 12051 can perform driving support for collision avoidance by outputting an alarm to the driver through the audio speaker 12061 or the display unit 12062 or performing forcible deceleration or avoidance steering through the drive-system control unit 12010.

[0155] At least one of the imaging units 12101 to 12104 may be an infrared camera that detects infrared light. For example, the microcomputer 12051 can recognize a pedestrian by judging whether or not a pedestrian is present in the images captured by the imaging units 12101 to 12104. Such pedestrian recognition is performed, for example, according to procedures for extracting characteristic points in images captured by the imaging units 12101 to 12104 as infrared cameras, and procedures for performing a pattern matching process on a series of characteristic points indicating the outline of an object to make a judgment as to whether or not the object is a pedestrian. If the microcomputer 12051 judges that a pedestrian is present in the captured images of the imaging units 12101 to 12104 and recognizes the pedestrian, the audio image output unit 12052 causes the display unit 12062 to display a square outline for emphasizing so as to be overlapped with the recognized pedestrian. Furthermore, the audio image output unit 12052 may cause the display unit 12062 to display an icon or the like indicating a pedestrian at a desired location.

An example of the vehicle control system to which the technology according to the present disclosure can be applied has been described above. The technology according to the present disclosure can be applied to the outside-vehicle information detection unit 12030 and the inside-vehicle information detection unit 12040 in the above-described configuration. Specifically, by using distance measurement by the distance measuring module 11 as the outside-vehicle information detection unit 12030 and the inside-vehicle information detection unit 12040, it is possible to perform processing of recognizing the gesture of the driver, execute various operations (for example, an audio system, a navigation system, and an air conditioning system) according to the gesture, and more accurately detect the condition of the driver. Furthermore, distance measurement by the distance measuring module 11 can be used to recognize unevenness of the road surface and to allow the unevenness to be reflected in control of the suspension.

Note that the present technology can be applied to a method for amplitude modulating light projected onto an object, which is referred to as a Continuous-Wave method among Indirect ToF methods. Furthermore, the structure of the photodiode 51 of the light receiving unit 21 can be applied to a distance measuring sensor having a structure in which electric charge is distributed to two electric charge storage units, such as a distance measuring sensor having a current assisted photonic demodulator (CAPD) structure or a gate-type distance measuring sensor that alternately applies pulses of electric charge of a photodiode to two gates. Furthermore, the present technology may be applied to a distance measuring sensor of a structured light method.

The embodiments of the present technology are not limited to the above-described embodiments, and various modifications can be made without departing from the scope of the present technology.

Each of the plurality of the present technologies described in the present Description can be implemented independently as long as there is no contradiction. It is needless to say that a plurality of arbitrary present technologies can be implemented in combination. For example, part or entirety of the present technology described in any of the embodiments can be implemented in combination with part or entirety of the present technology described in another embodiment. Furthermore, part or entirety of an arbitrary present technology described above can be implemented in combination with another technology not described above.

Furthermore, for example, a configuration described as one device (or processing unit) may be divided and configured as a plurality of devices (or processing units). In contrast, the configurations described as a plurality of devices (or processing units) hereinbefore may be collectively configured as one device (or processing unit). Furthermore, it goes without saying that a configuration other than those described above may be added to the configuration of each device (or each processing unit). Moreover, if the configuration and operation of the system as a whole are substantially the same, part of the configuration of a certain device (or processing unit) may be included in the configuration of another device (or another processing unit).

Moreover, in the present Description, a system means a set of a plurality of constituents (devices, modules (components), or the like), and it does not matter whether or not all the constituents are in the same case. Therefore, each of a plurality of devices housed in separate cases and connected via a network, and one device in which a plurality of modules is housed in one case are a system.

Furthermore, for example, the program described above can be executed in an arbitrary device. In that case, it is sufficient that the device has a necessary function (functional block or the like) and can obtain necessary information.

Note that the present technology can be configured as follows.

(1)

A distance measuring sensor including a distance measuring unit that calculates distance information to an object from a signal obtained by a light receiving unit that receives reflected light obtained by reflection of irradiation light emitted from a predetermined light emitting source by the object, an ambient light calculation unit that calculates an ambient light component included in the signal obtained by the light receiving unit, and an outdoor information calculation unit that calculates outdoor information on the basis of the ambient light component.

(2)

The distance measuring sensor according to the (1) further including a normalization unit that normalizes the ambient light component calculated by the ambient light calculation unit, in which the outdoor information calculation unit estimates the outdoor information on the basis of the ambient light component that has been normalized.

(3)

The distance measuring sensor according to the (2), in which the normalization unit normalizes the ambient light component by using an exposure time and the number of pixels.

(4)

The distance measuring sensor according to the (2), in which the normalization unit normalizes the ambient light component by using an exposure time, the number of pixels, and the distance information.

(5)

The distance measuring sensor according to any one of the (1) to (4), in which the ambient light calculation unit calculates the ambient light component by subtracting a dark current component from the signal obtained by the light receiving unit.

(6)

The distance measuring sensor according to any one of the (1) to (5), in which both the distance information and the outdoor information are calculated by using a signal obtained by the light receiving unit.

(7)

The distance measuring sensor according to any one of the (1) to (6), in which as an operation mode, a first operation mode of calculating both the distance information and the outdoor information, a second operation mode of calculating the distance information without calculating the outdoor information, or a third operation mode of calculating the outdoor information without calculating the distance information is provided.

(8)

The distance measuring sensor according to any one of the (1) to (7), in which the ambient light calculation unit calculates the ambient light component of a region of interest that is part of a light receiving region of the light receiving unit.

(9)

The distance measuring sensor according to the (8), in which the ambient light calculation unit acquires region information indicating the region of interest and calculates the ambient light component of the region of interest.

(10)

The distance measuring sensor according to the (9), in which the ambient light calculation unit acquires region information indicating the region of interest, the region information having been detected by an imaging sensor that generates a captured image obtained by receiving RGB light, and calculates the ambient light component of the region of interest.

(11)

The distance measuring sensor according to the (8), in which the distance measuring unit further calculates reliability information in addition to the distance information, the distance measuring sensor further including a region detecting unit that detects the region of interest by using at least one of the distance information or the reliability information, and the ambient light calculation unit calculates the ambient light component of the region of interest.

(12)

The distance measuring sensor according to any one of the (1) to (11) further including a filtering unit that performs predetermined filter processing on the distance information, the filtering unit performing the predetermined filtering processing on the basis of the outdoor information.

(13)

The distance measuring sensor according to any one of the (1) to (12) further including a controlling unit that controls an exposure time on the basis of the signal obtained by the light receiving unit.

(14)

The distance measuring sensor according to any one of the (1) to (13), in which the outdoor information calculation unit calculates, as the outdoor information, whether the outdoor information represents the outdoors or indoors.

(15)

The distance measuring sensor according to any one of the (1) to (13), in which the outdoor information calculation unit calculates a probability of being the outdoors as the outdoor information.

(16)

A signal processing method including by using a distance measuring sensor, calculating distance information to an object from a signal obtained by a light receiving unit that receives reflected light obtained by reflection of irradiation light emitted from a predetermined light emitting source by the object, by using the distance measuring sensor, calculating an ambient light component included in the signal obtained by the light receiving unit, and by using the distance measuring sensor, calculating outdoor information on the basis of the ambient light component.

(17)

A distance measuring module including a predetermined light emitting source, and a distance measuring sensor, the distance measuring sensor including a distance measuring unit that calculates distance information to an object from a signal obtained by a light receiving unit that receives reflected light obtained by reflection of irradiation light emitted from the predetermined light emitting source by the object, an ambient light calculation unit that calculates an ambient light component included in the signal obtained by the light receiving unit, and an outdoor information calculation unit that calculates outdoor information on the basis of the ambient light component.

REFERENCE SIGNS LIST

11 Distance measuring module
12 Light emitting source
13 Light emission controlling unit
14 Distance measuring sensor
21 Light receiving unit
22 Distance measuring unit
23 Ambient light calculation unit
24 Ambient light normalization unit
25 Outdoor information calculation unit
26 Filtering unit
81 Subject region detecting unit
82 Ambient light calculation unit 91 Region
101 Imaging sensor
111 Light receiving unit
112 Signal processing unit
121 Demosaic processing unit
122 ROI determination unit
123 Filtering unit
201 Smartphone
202 Distance measuring module
301 CPU
302 ROM
303 RAM

The invention claimed is:

1. A distance measuring sensor, comprising:
a pixel array unit comprising a plurality of pixels, wherein the pixel array unit is configured to:
  receive, by the plurality of pixels, light reflected by an object; and
  generate, by the plurality of pixels, a detection signal based on the received light; and
circuitry configured to:
calculate distance information from the distance measuring sensor to the object, wherein the distance information is calculated based on the detection signal;
calculate an ambient light component included in the detection signal;
normalize the ambient light component based on an exposure time of a light emission controlling unit, the plurality of pixels, and the distance information; and
calculate outdoor information based on the normalized ambient light component, wherein the outdoor information is a binary value indicating one of an environment of the object is outdoors or the environment of the object is indoors.

2. The distance measuring sensor according to claim 1, wherein
the circuitry is further configured to subtract a dark current component from the detection signal, and
the calculation of the ambient light component is based on the subtraction of the dark current component from the detection signal.

3. The distance measuring sensor according to claim 1, wherein the circuitry is further configured to calculate the outdoor information based on the detection signal.

4. The distance measuring sensor according to claim 1, wherein an operation mode of the distance measuring sensor, is one of
a first operation mode for calculation of both the distance information and the outdoor information,
a second operation mode for calculation of the distance information without the calculation of the outdoor information, or
a third operation mode for calculation of the outdoor information without the calculation of the distance information.

5. The distance measuring sensor according to claim 1, wherein
the calculated ambient light component is of a region of interest, and
the region of interest is a part of a light receiving region of the pixel array unit.

6. The distance measuring sensor according to claim 5, wherein the circuitry is further configured to acquire region information indicating the region of interest.

7. The distance measuring sensor according to claim 6, wherein
the region information is detected by an imaging sensor, and
the imaging sensor generates a captured image based on reception of RGB light.

8. The distance measuring sensor according to claim 5, wherein
the circuitry is further configured to:
calculate reliability information; and
detect the region of interest based on at least one of the distance information or the reliability information.

9. The distance measuring sensor according to claim 1, wherein the circuitry is further configured to perform a filter processing on the distance information, based on the outdoor information.

10. The distance measuring sensor according to claim 1, wherein the circuitry is further configured to control the exposure time of the light emission controlling unit based on the detection signal.

11. A signal processing method, comprising:
receiving light, by a plurality of pixels of a pixel array unit, based on reflection of the light by an object; and
generating, by the plurality of pixels of the pixel array unit, a detection signal based on the received light;
calculating, by circuitry, distance information from a distance measuring sensor to the object, wherein the distance information is calculated based on the detection signal;
calculating, by the circuitry, an ambient light component included in the detection signal;
normalizing, by the circuitry, the ambient light component based on an exposure time of a light emission controlling unit, the plurality of pixels, and the distance information; and
calculating, by the circuitry, outdoor information based on the normalized ambient light component, wherein the outdoor information is a binary value indicating one of an environment of the object is outdoors or the environment of the object is indoors.

12. A distance measuring module, comprising:
a light emitting source; and
a distance measuring sensor, wherein the distance measuring sensor includes:
a pixel array unit comprising a plurality of pixels configured to:
  receive, by the plurality of pixels, light reflected by an object; and
  generate, by the plurality of pixels, a detection signal based on the received light; and
circuitry configured to:
  calculate distance information from the distance measuring sensor to the object, wherein the distance information is calculated based on the detection signal;
  calculate an ambient light component included in the detection signal;
  normalize the ambient light component based on an exposure time of a light emission controlling unit, the plurality of pixels, and the distance information; and
  calculate outdoor information based on the normalized ambient light component, wherein the outdoor information is a binary value indicating one of an environment of the object is outdoors or the environment of the object is indoors.

* * * * *